United States Patent
Ying et al.

(10) Patent No.: US 11,757,572 B2
(45) Date of Patent: Sep. 12, 2023

(54) USER EQUIPMENTS, BASE STATIONS AND METHODS FOR UPLINK TRANSMISSION

(71) Applicant: Sharp Kabushiki Kaisha, Sakai (JP)

(72) Inventors: Kai Ying, Vancouver, WA (US); Tatsushi Aiba, Osaka (JP); John Michael Kowalski, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/968,713

(22) PCT Filed: Jan. 17, 2019

(86) PCT No.: PCT/US2019/014032
§ 371 (c)(1),
(2) Date: Aug. 10, 2020

(87) PCT Pub. No.: WO2019/160644
PCT Pub. Date: Aug. 22, 2019

(65) Prior Publication Data
US 2021/0014005 A1   Jan. 14, 2021

Related U.S. Application Data

(60) Provisional application No. 62/630,732, filed on Feb. 14, 2018.

(51) Int. Cl.
*H04L 1/1607* (2023.01)
*H04W 72/0446* (2023.01)

(52) U.S. Cl.
CPC ....... *H04L 1/1664* (2013.01); *H04W 72/0446* (2013.01)

(58) Field of Classification Search
CPC .................. H04L 1/1664; H04W 72/0446
See application file for complete search history.

(56) References Cited

U.S. PATENT DOCUMENTS

2009/0207793 A1   8/2009   Shen et al.
2013/0215862 A1*  8/2013   Suzuki .............. H04W 72/14
                                              370/329

(Continued)

FOREIGN PATENT DOCUMENTS

WO   2019032748 A1   2/2019

OTHER PUBLICATIONS

3GPP TR 22.862 v1.0.0, 3rd Generation Partnership Project; Technical Specification Group Services and System Aspects; Feasibility Study on New Services and Markets Technology Enablers—Critical Communications; Stage 1 (Release 14), Feb. 2016.

(Continued)

*Primary Examiner* — Michael Thier
*Assistant Examiner* — Nevena Zecevic Sandhu
(74) *Attorney, Agent, or Firm* — Austin Rapp

(57) ABSTRACT

A user equipment (UE) is described. The UE includes receiving circuity configured to receive a radio resource control (RRC) message comprising a first parameter used for configuring a periodicity. The receiving circuitry is also configured to receive a RRC message comprising a second parameter used for configuring a number of repetitions. The UE also includes transmitting circuitry configured to perform, based on the first parameter and the second parameter, repetitions of transmissions of a transport block. The UE is not expected to be configured with the number of repetitions larger than the number of slots within the period.

4 Claims, 19 Drawing Sheets

Period boundary is fixed (e.g., start slot index of a period is a multiple of period P)

Period boundary is flexible (e.g., start slot index of a period is the same as the resource given by configured grant)

(56) References Cited

U.S. PATENT DOCUMENTS

| | | | |
|---|---|---|---|
| 2016/0227580 A1* | 8/2016 | Xiong | H04W 72/048 |
| 2017/0202008 A1 | 7/2017 | Nader et al. | |
| 2017/0273113 A1* | 9/2017 | Tirronen | H04W 72/042 |
| 2018/0199334 A1 | 7/2018 | Ying et al. | |
| 2018/0295651 A1* | 10/2018 | Cao | H04W 74/0833 |

OTHER PUBLICATIONS

3GPP TR 38.913 v0.3.0, 3rd Generation Partnership Project; Technical Specification Group Radio Access Network; Study on Scenarios and Requirements for Next Generation Access Technologies (Release 14), Mar. 2016.

3GPP TS 38.211 V15.0.0, 3rd Generation Partnership Project; Technical Specification Group Radio Access Network; NR; Physical channels and modulation (Release 15), Dec. 2017.

3GPP TS 38.212 V15.0.0, 3rd Generation Partnership Project; Technical Specification Group Radio Access Network; NR; Multiplexing and channel coding (Release 15), Dec. 2017.

3GPP TS 38.213, V15.0.0, 3rd Generation Partnership Project; Technical Specification Group Radio Access Network; NR; Physical layer procedures for control (Release 15), Dec. 2017.

3GPP TS 38.214 V15.0.0, 3rd Generation Partnership Project; Technical Specification Group Radio Access Network; NR; Physical layer procedures for data (Release 15), Dec. 2017.

Ericsson, "Text proposal on 38.331", 3GPP TSG RAN WG1 Meeting AH 1801, Vancouver, Canada, 1-1801095, Jan. 22, 2018-Jan. 26, 2018.

Huawei, HiSilicon, "Overview of URLLC support in NR", 3GPP TSG RAN WG1 Meeting #86bis, Lisbon, Portugal, R1-1608843, Oct. 10, 2016-Oct. 14, 2016.

MCC Support, "Final Report of 3GPP TSG RAN WG1 #AH_1801 v1.0.0 (Vancouver, Canada, Jan. 22-26, 2018)", 3GPP TSG RAN WG1 Meeting #92, Athens, Greece, R1-1801302, Feb. 26, 2018-Mar. 2, 2018.

NTT Docomo, Inc., "Overall solutions for UL grant free transmission", 3GPP TSG RAN WG1 NR Ad-Hoc#2, Qingdao, China, R1-1711111, Jun. 27, 2017-Jun. 30, 2017.

* cited by examiner

USER EQUIPMENTS, BASE STATIONS AND METHODS FOR UPLINK TRANSMISSION

RELATED APPLICATIONS

This application is related to and claims priority from U.S. Provisional Patent Application No. 62/630,732, entitled "USER EQUIPMENTS, BASE STATIONS AND METHODS FOR UPLINK TRANSMISSION WITHOUT GRANT," filed on Feb. 14, 2018, which is hereby incorporated by reference herein, in its entirety.

TECHNICAL FIELD

The present disclosure relates generally to communication systems. More specifically, the present disclosure relates to user equipments, base stations, and methods for uplink transmission.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
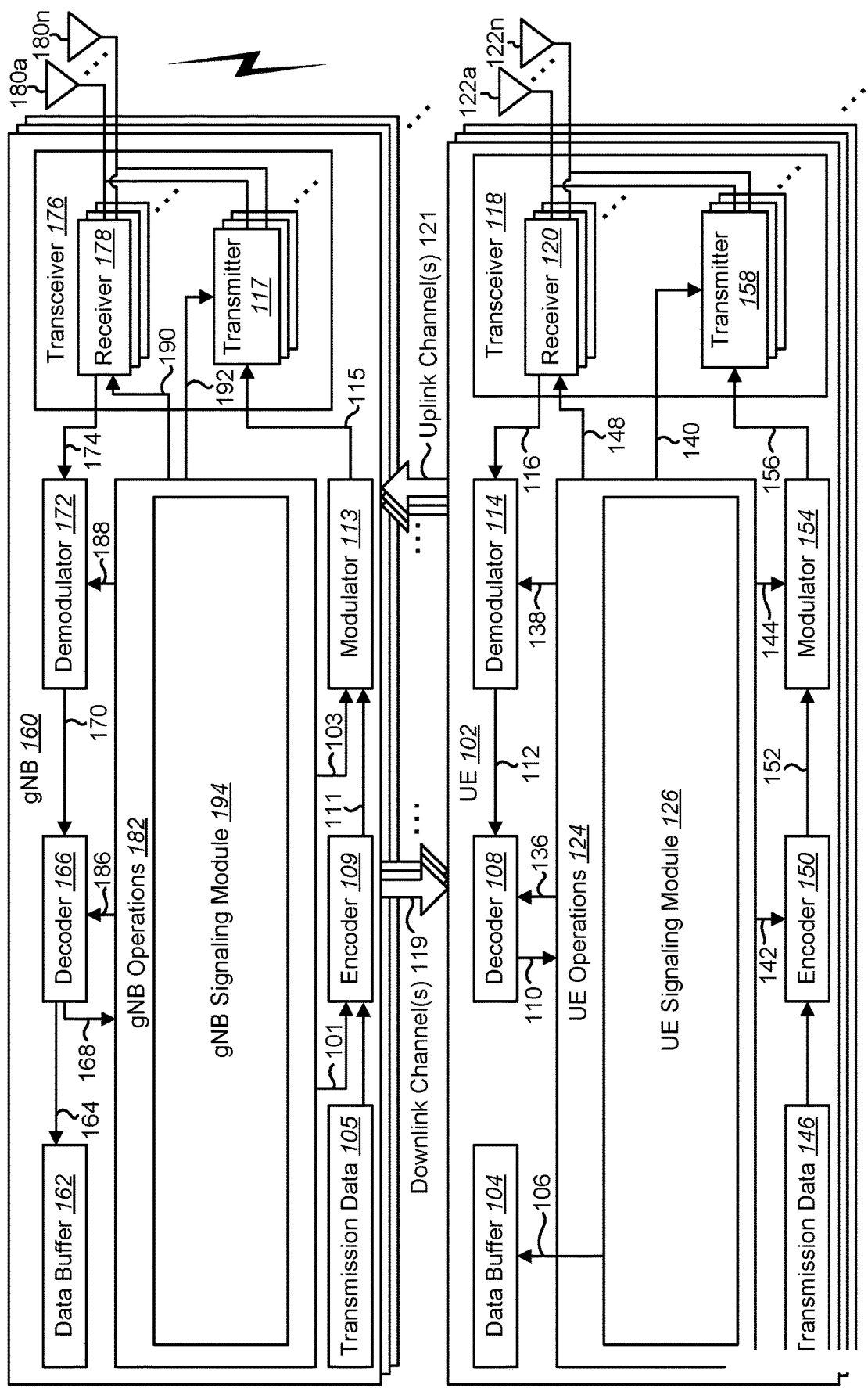
FIG. 1 is a block diagram illustrating one implementation of one or more base stations (gNBs) and one or more user equipments (UEs) in which systems and methods for uplink transmission without grant may be implemented.

A user equipment (UE) is described. The UE includes receiving circuity configured to receive a radio resource control (RRC) message comprising a first parameter used for configuring a periodicity. The receiving circuitry is also configured to receive a RRC message comprising a second parameter used for configuring a number of repetitions. The UE also includes transmitting circuitry configured to perform, based on the first parameter and the second parameter, repetitions of transmissions of a transport block. The UE is not expected to be configured with the number of repetitions larger than the number of slots within the period.

A base station apparatus is also described. The base station apparatus includes transmitting circuitry configured to transmit a radio resource control (RRC) message comprising a first parameter used for configuring a periodicity. The transmitting circuitry is also configured to transmit a RRC message comprising a second parameter used for configuring a number of repetitions. The base station apparatus also includes receiving circuitry configured to receive, based on the first parameter and the second parameter, repetitions of transmissions of a transport block. The number of repetitions larger than the number of slots within the period is not configured.

A communication method of a UE is also described. The method includes receiving a radio resource control (RRC) message comprising a first parameter used for configuring a periodicity. The method also includes receiving a RRC message comprising a second parameter used for configuring a number of repetitions. The method also includes transmitting circuity configured to perform, based on the first parameter and the second parameter, repetitions of transmissions of a transport block. The UE is not expected to be configured with the number of repetitions larger than the number of slots within the period.

A communication method of a base station apparatus is also described. The method includes transmitting a radio resource control (RRC) message comprising a first parameter used for configuring a periodicity. The method also includes transmitting a RRC message comprising a second parameter used for configuring a number of repetitions. The method also includes receiving, based on the first parameter and the second parameter, repetitions of transmissions of a transport block. The number of repetitions larger than the number of slots within the period is not configured.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

Some configurations of the systems and methods described herein teach approaches for URLLC transmission/retransmission management to meet the latency/reliability requirement. Some requirements for URLLC relate to user (U)-plane latency and reliability. For URLLC, the target user plane latency is 0.5 milliseconds (ms) each way for both UL and DL. The target reliability is $1\text{-}10^{-5}$ for X bytes within 1 milliseconds (ms).

These URLLC-specific constraints make the hybrid automatic repeat request (HARQ) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ/retransmission design in different cases.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for uplink transmission without grant may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)). Also, HARQ-ACK, CSI and/or the SR may be included in UCI (e.g., Uplink Control Information).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

Also, the PRACH may be used for a random access preamble (e.g., a message 1 (Msg.1)) transmission in a random access procedure. Here, the random access procedure may include a contention based random access procedure (e.g., a CBRA procedure) and/or a non-contention based random access procedure (e.g., a contention free random access procedure (e.g., a CFRA procedure)). In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink PSCH (e.g., PUSCH) resource).

Also, in the random access procedure, a random access response (e.g., a message 2 (Msg.2)) may be transmitted on the PDSCH. For example, the PDSCH for the random access response may be scheduled by using the PDCCH with RA-RNTI (random access RNTI (radio network temporary identifier)). Also, the random access response grant included in the random access response may be used for scheduling of the uplink PSCH (e.g., the PUSCH, a message 3 (Msg.3) in the random access procedure (e.g., the contention based random access procedure)). Namely, the PUSCH transmission (e.g., the message 3 (Msg. 3 transmission)) is scheduled by using the random access response grant as a part of the contention based random access procedure.

Here, as described above, the random access procedure may include the contention based random access procedure and/or the non-contention based random access procedure.

For example, the contention based random access procedure may include a 4-step procedure. Also, the non-contention based random access procedure may include a 2-step (e.g., and/or 3 step) procedure.

For example, in the contention based random access procedure, the UE 102 may transmit the random access preamble (e.g., Msg. 1) using the PRACH occasion(s). Also, in random access response reception (e.g., in the contention based random access procedure), the UE 102 may receive the random access response (e.g., Msg. 2). For example, once the random access preamble is transmitted, the UE 102 may monitor, in the RA Response window, the PDCCH for the random access response(s) identified by the RA-RNTI. Namely, the UE 102 may receive the random access response on the DL-SCH (e.g., the PDSCH) that is scheduled by using the PDCCH with the CRC scrambled by the RA-RNTI. And, the UE 102 may stop monitoring for the random access response(s) after successful reception of the random access response containing the one or more random access preambles identifiers that match the transmitted random access preamble.

Namely, the random access response may contain the one or more random access preamble identifies. Also, the random access response may include a Timing Advance command. Also, the random access response may include the random access response grant. As described above, the PUSCH transmission (e.g., the UL-SCH transmission, Msg. 3 transmission) may be scheduled by using the random access response grant. For example, an initial transmission (e.g., a new transmission) of the PUSCH (e.g., the UL-SCH, Msg. 3) may be scheduled by using the random access response grant. Also, the random access response may contain the Temporary C-RNTI. For example, the PUSCH transmission (e.g., the UL SCH transmission, Msg. 3 transmission) may be scheduled by using the PDCCH (e.g., the DCI format(s) for the uplink) with the CRC scrambled by the Temporary C-RNTI. For example, retransmission of the PUSCH (e.g., retransmission of the same transport block, the UL-SCH, Msg.3) may be scheduled by using the PDCCH with the CRC scrambled by the Temporary C-RNTI.

Also, in scheduled transmission (e.g., in the contention based random access procedure), the UE 102 may perform a timing adjustment for the uplink transmission based on the Timing Advance command. Also, the UE 102 may perform the PUSCH transmission (e.g., the UL-SCH transmission, Msg.3 transmission) based on the random access response grant. Here, the Msg.3 transmission may include an identity used for identifying the UE 102 (Initial UE-Identity or the C-RNTI). As described above, the UE 102 may perform the initial transmission (e.g., the new transmission) of the PUSCH (e.g., the UL-SCH, Msg. 3) that may be scheduled by using the random access response grant. Also, the UE 102 may perform the retransmission of the PUSCH (e.g., retransmission of the same transport block, the UL-SCH, Msg.3) that may be scheduled by using the PDCCH with the CRC scrambled by the Temporary C-RNTI.

Also, in contention resolution (e.g., in the contention based random access procedure), in a case that a contention resolution identity received from the gNB 160 is matched to the Initial UE-Identity, the UE 102 may consider the contention resolution successful. Also, in a case that the PDCCH with the CRC scrambled by the C-RNTI is received, the UE 102 may consider the contention resolution successful. Then, the UE 102 may consider the random access procedure successfully completed.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE signaling module 126.

The UE 102 (e.g., UE signaling module 126) and/or gNB 160 (e.g., gNB signaling module 194) may perform one or more operations relating to uplink (UL) transmission without grant. For example, the UE 102 and/or gNB 160 may perform resource determination and/or collision handling for UL transmission without grant. A UE 102 (e.g., NR UE or a UE 102 in NR) may support multiple types of uplink transmissions without grant (which may be referred to as grant-free (GF) uplink transmission, GF transmission, and/or transmission by configured grant). A first type (Type 1) of GF transmission may be a UL data transmission without grant that may be only based on radio resource control (RRC) (re)configuration without any L1 signaling. In a second type (Type 2) of GF transmission, UL data transmission without grant may be based on both RRC configuration and layer 1 (L1) signaling for activation/deactivation for UL data transmission without grant.

One or more parameters may be utilized for time domain resource determination. Examples of parameters may include periodicity, time domain offset, time domain allocation, number of repetitions, and/or aggregations factor. More detail regarding the parameters is given as follows.

Periodicity (P) is a time interval between two consecutive initial transmissions by configured grants (not two consecutive repetitions). In some approaches, periodicity is RRC configured in a SPS-Config information element for both Type 1 and Type 2. The value can be in unit of symbol or milliseconds (ms). In this disclosure, the slot is used as the unit of periodicity as an example, although other units of periodicity may be utilized. The ms units may be converted into slots by taking into account numerology and the number of symbols within a slot.

Figure 2:
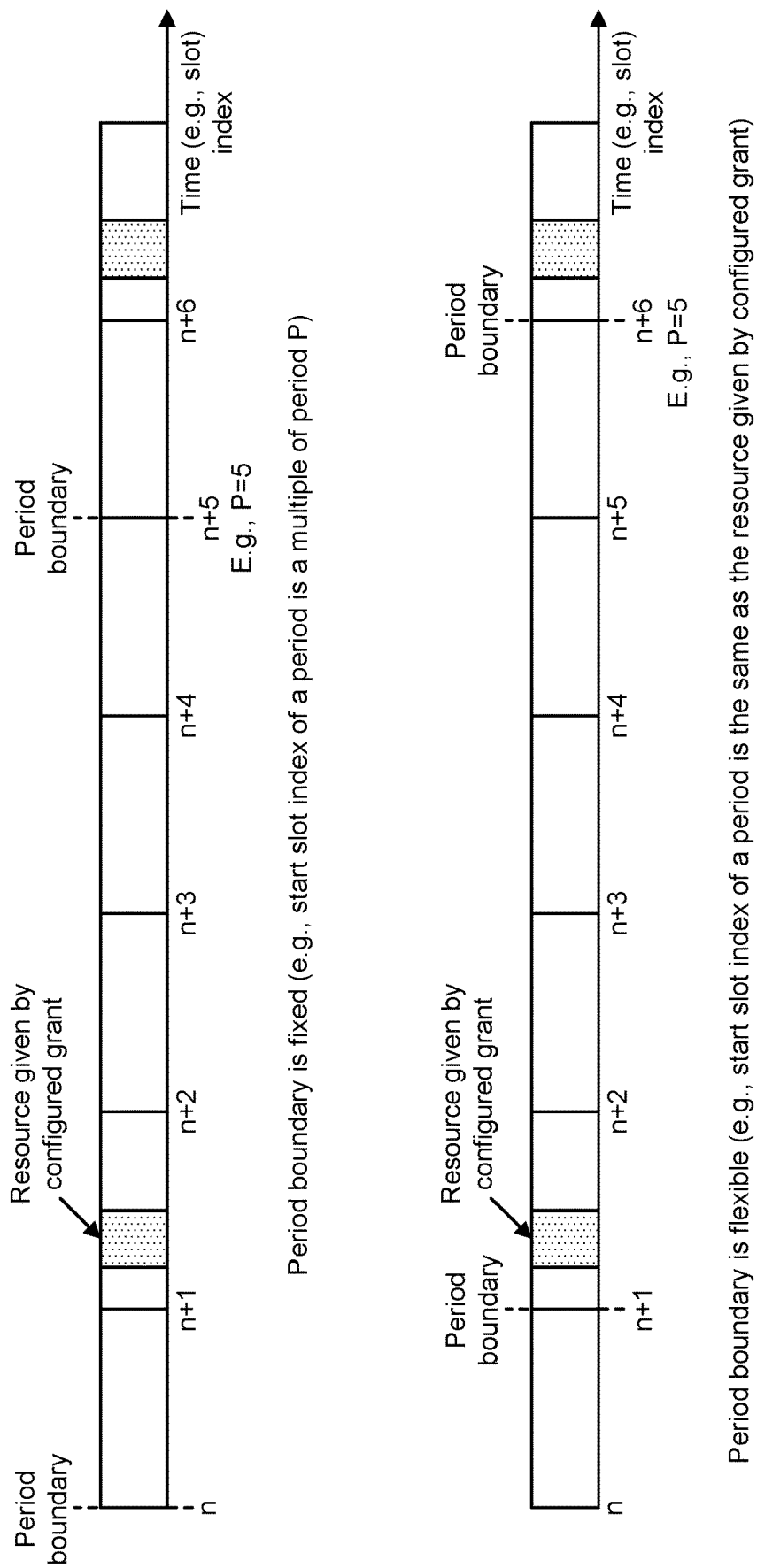
FIG. 2 illustrates examples of a fixed period boundary and a flexible period boundary.

One issue is how to determine the window of a period, start position of a period, and/or period boundary. In some approaches, the period boundary may be fixed. For example, a period may start a fixed position. For instance, a start slot index of a period may be a multiple of periodicity P. In some approaches, the period boundary may be flexible. For example, the period boundary may not always be fixed. For instance, a start slot index of a period may be the same as the resource given by configured grant. Examples of a fixed period boundary and a flexible period boundary are illustrated in FIG. 2. Whether the period boundary is fixed or flexible may be configurable in some approaches.

A time domain offset may determine the start position of an UL transmission without grant. For Type 1, the time domain offset may be RRC configured and the time domain offset unit may be the slot (additionally or alternatively, the time domain offset unit may be subframe or symbol, etc.). One issue may be how to determine the reference point for time domain offset. In some approaches, the reference point may be the same as the period boundary (if the period boundary is fixed). In some approaches, the reference point may be at a fixed position (e.g., slot index 0 or any position).

For Type 2, the time domain offset may be the timing for PDCCH activation to a first UL transmission occasion, which may be denoted by K2. K2 may be configured by RRC. K2 may be indicated by PDCCH (DCI) for activation of Type 2. K2 may be indicated by DCI format 0_0 (i.e., fallback DCI) for activation of Type 2. K2 may be indicated by DCI format 0_1 (i.e., non-fallback DCI) for activation of Type 2. If DCI format 0_0 and DCI format 0_1 are received for an UL Type 2 GF transmission, K2 included in DCI format 0_0 may be applied. If DCI format 0_0 and DCI format 0_1 are received for a UL Type 2 GF transmission, K2 included in DCI format 0_1 may be applied. The UE 102 may not be expected to receive DCI format 0_0 and DCI format 0_1 for an UL Type 2 GF transmission.

Remaining minimum system information (RMSI) is used for carrying K2 timing information. K2, carried by RMSI, may be used for UL Type 2 activated by using DCI format 0_0 (i.e., fallback DCI).

A set of values of K2 may be configured by RRC and the choice (e.g., selection) of K2 may be indicated, among the set of values of K2, by PDCCH (DCI) for activation of UL Type 2 GF. K2 may be fixed or a default value may be pre-defined (i.e., a predetermined value). For example, if K2 is not explicitly indicated (by the RRC and/or by the PDCCH for activation of UL Type 2, for instance), the default value (e.g., 4) may be applied. The default value may be used for UL Type 2 GF activated by using DCI format 0_0 (i.e., fallback DCI).

If a K2 timing field is not present or the timing field is 0-bit in DCI for activation of UL Type 2 GF (e.g., the presence of the timing field K2 may be configured by RRC, the timing field K2 may be present only in DCI format 0_1 (i.e., non-fallback DCI) for activation of UL Type GF, and/or the timing field K2 may not be present in DCI format 0_0 (i.e., fall back DCI) for activation of UL Type 2 GF), K2 may be indicated in accordance with one or more of the following approaches. Re-interpretation of DCI field: a different DCI field may be used to indicate K2. RMSI may be used for carrying K2 timing information. The first value in a configured set may be used, or any predefined value may be used.

The time domain allocation may determine any one of valid combinations of a start symbol and length and PUSCH mapping type that are specified for uplink transmission. Time domain allocation may be presented by a row index of an RRC configured table [pusch-symbolAllocation], where the indexed row may define the slot offset K2, the start and length indicator SLIV, and/or the PUSCH mapping type to be applied in the PUSCH reception. For Type 1, the time domain allocation may be RRC configured.

For Type 2, the time domain allocation may be determined in accordance with one or more of the following approaches. The time domain allocation may be configured by RRC. The time domain allocation may be indicated by PDCCH (DCI) for activation of Type 2. The time domain allocation may be indicated by DCI format 0_0 (i.e., fallback DCI) for activation of Type 2. The time domain allocation may be indicated by DCI format 0_1 (i.e., non-fallback DCI) for activation of Type 2. For example, if DCI format 0_0 and DCI format 0_1 are received for a UL Type 2 GF transmission, time domain allocation included in DCI format 0_0 may be applied. In another example, if DCI format 0_0 and DCI format 0_1 are received for a UL Type 2 GF transmission, time domain allocation included in DCI format 0_1 may be applied. The UE 102 may not be expected to receive DCI format 0_0 and DCI format 0_1 for UL Type 2 GF transmission.

RMSI may be used for carrying time domain allocation information. For example, time domain allocation carried by RMSI may be used for UL Type 2 activated by using DCI format 0_0 (i.e., fallback DCI).

A set of values of time domain allocation (e.g., a table) may be configured by RRC. Additionally, the choice (e.g., selection) of time domain allocation may be indicated, among the set of values of time domain allocation, by PDCCH (DCI) for activation of UL Type 2 GF.

Time domain allocation may be fixed or a default value may be pre-defined (i.e., a predetermined value). For example, if the time domain allocation is not explicitly indicated (e.g., by the RRC and/or by the PDCCH for activation of UL Type 2), the default value (e.g., the starting symbol may be at symbol index #0 in a slot and length of the PUSCH is 14 symbols) may be applied. The default value may be used for UL Type 2 GF activated by using DCI format 0_0 (i.e., fallback DCI).

If time domain allocation field is not present or the time domain allocation field is 0-bit in DCI for activation of UL Type 2 GF (e.g., the presence of the time domain allocation may be configured by RRC, the time domain allocation is present only in DCI format 0_1 (i.e., non-fallback DCI) for activation of UL Type GF, and/or the time domain allocation may not be present in DCI format 0_0 (i.e., fall back DCI) for activation of UL Type 2 GF), the time domain allocation may be indicated in accordance with one or more of the following approaches. Re-interpretation of DCI field: a different DCI field can be used to indicate time domain allocation. RMSI may be used for carrying time domain allocation information. The first value in a configured set may be used, or any predefined value may be used. In some approaches, the same symbol allocation may be used across slots in UL in a case that repetitions and/or slot-aggregation is configured.

The number of repetitions parameter may be denoted K. The transport block (TB) may be repeated across the slots and the number of repetitions may be K. K may be RRC configured. For example, K may be configured, by using the RRC message, for both Type 1 and/or Type 2 (e.g., PUSCH transmissions based on the configured grant Type 1 (e.g., by the RRC message), and/or PUSCH transmission based on the configured grant Type 2 (e.g., by the RRC message and/or the DCI format(s) used for indicating the configured grant Type 2 activation). Here, the DCI format(s) used for indicating the configured grant Type 2 activation may be a DCI format(s) with CRC scrambled by a CS-RNTI (e.g., Configured scheduling-RNTI). There may be several interpretations of K. In some approaches, K may be the number of real transmissions for repetitions. In some approaches, K may be the number of transmission occasions for repetitions. The same symbol allocation may or may not be applied across the slots for repetitions.

The aggregation factor parameter may be denoted aggregationFactorUL. The TB may be repeated across the slots and the number of the slots may be aggregationFactorUL. The aggregationFactorUL may be RRC configured. For example, the aggregationFactorUL may be configured for PDCCH. Also, the aggregationFactorUL may be configured for PUSCH transmission (e.g., PUSCH transmission scheduled by using the DCI format(s) with CRC scrambled by the C-RNTI). Also, the aggregationFactorUL may be configured for both Type 1 and Type 2. Here, the aggregationFactorUL may be configured per serving cell. For example, the aggregationFactorUL may be configured for each of the primary cell and/or the one or more secondary cell. Also, the aggregationFactorUL may be configured per bandwidth part (e.g., per uplink bandwidth part (UL BWP)). For example, the aggregationFactorUL may be configured for each of the UL BWPs in a serving cell. And, when the UE is configured with aggregationFactorUL>1, the same symbol allocation may be applied across the aggregationFactorUL consecutive slots not defined as DL by the slot format indication. There may be several interpretations of aggregationFactorUL. In some approaches, aggregationFactorUL may be the number of used slots for real transmissions of repetitions. In some approaches, aggregationFactorUL may be the number of transmission occasions for repetitions or number of slots which can be used for repetitions.

As described above, the gNB 160 may configure, by using the RRC message, the aggregationFactorUL. For example, the gNB 160 may configure, by using the RMSI, the aggregationFactorUL. Also, the gNB 160 may configure, by using the dedicated RRC message, the aggregationFactorUL. For example, in a case that the aggregationFactorUL included in the dedicated RRC message is not configured (e.g., no value of the aggregationFactorUL is configured by using the dedicated RRC message), the aggregationFactorUL configured by using the RMSI may be used. Also, the aggregationFactorUL included in the dedicated RRC message is configured, the aggregationFactorUL included in the dedicated RRC message may be used. Namely, the aggregationFactorUL included in the dedicated RRC message may override the aggregationFactorUL included in the RMSI. Also, a default value (e.g., a predetermined value) for the aggregationFactorUL may be defined (e.g., by the specification). For example, a value of "1" may be defined as the default value for the aggregationFactorUL. And, in a case that the aggregationFactorUL included in the dedicated RRC message is not configured (e.g., no value of the aggregationFactorUL is configured by using the dedicated RRC message), the default value for aggregationFactorUL may be used.

Here, the aggregationFactorUL (e.g., a value of the aggregationFactorUL) configured by using the RMSI described herein may be assumed to be included in a first value in some implementation for the sake of simplifying description. Also, the default value (e.g., a fixed (e.g., a predetermined value), e.g., "1") for the aggregationFactorUL described herein may be assumed to be included in a second value in some implementations for the sake of simplifying description. Also, the aggregationFactorUL (e.g., a value of the aggregationFactorUL) configured by using the dedicated RRC message described herein may be assumed to be included in a third value in some implementations for the sake of simplifying description. Here, the first value and/or the third value may be included in a configuration for the PDCCH (e.g., the PDCCH configuration included in the RMSI and/or the dedicated RRC message).

As described above, the third value may be configured for PUSCH transmission scheduled by using the DCI format(s) with CRC scrambled by the C-RNTI. For example, the third value may be used for only PUSCH transmission scheduled by using the DCI format(s) with CRC scrambled by the C-RNTI. Namely, in a case that the DCI format(s) (e.g., the DCI format(s) used for scheduling of the PUSCH) with CRC scrambled by the C-RNTI is received, the UE 102 may use the third value to perform PUSCH transmission. Also, the third value may be configured for Type 1 and/or Type 2. For example, the third value may be used for PUSCH transmission scheduled by using the DCI format with CRC scrambled by the C-RNTI and/or the CS-RNTI. Namely, in a case that the DCI format(s) (e.g., the DCI format(s) used for scheduling of the PUSCH) with CRC scrambled by the C-RNTI and/or the CS-RNTI is received, the UE 102 may use the third value to perform PUSCH transmission.

Also, the third value may be used for PUSCH transmission scheduled by using the DCI format 0_1 (e.g., non-fallback DCI). For example, the third value may be used for only PUSCH transmission scheduled by using the DCI format 0_1 with CRC scrambled by the C-RNTI. Namely, in a case that the DCI format 0_1 (e.g., the DCI format(s) used for scheduling of the PUSCH) with CRC scrambled by the C-RNTI is received, the UE 102 may use the third value to perform PUSCH transmission. Here, the DCI format 0_1 (e.g., the DCI format 0_1 with CRC scrambled by the C-RNTI) may be received (e.g., detected, monitored) in only the UE-specific search space (e.g., a USS). Namely, the UE 102 may receive the DCI format 0_1 (e.g., the DCI format 0_1 with CRC scrambled by the C-RNTI) in the USS only.

Here, the first value and/or the second value may be used for PUSCH transmission scheduled by using the random access response grant. For example, the first value and/or the second value may be used for PUSCH transmission (e.g., Message 3 transmission) that corresponds to the random access response grant. Namely, in the random access procedure (e.g., the contention based random access procedure), in a case that the random access response grant is received (e.g., based on a detection of the random access response grant), the UE 102 may use the first value and/or the second value to perform PUSCH transmission (e.g., Message 3 transmission). Also, the first value and/or the second value may be used for PUSCH transmission scheduled by using the DCI format with CRC scrambled by the Temporary C-RNTI (e.g., the DCI format 0_0 with CRC scrambled by the Temporary C-RNTI, the PDCCH with CRC scrambled by the Temporary C-RNTI). For example, the fist value and/or the second value may be used for PUSCH transmission (e.g., Message 3 transmission) that corresponds to the DCI format with CRC scrambled by the Temporary C-RNTI. Namely, the first value and/or the second value may be used for PUSCH transmission that corresponds to retransmission of the same transport block (e.g., the UL-SCH, Message 3). Namely, in a case that the DCI format with CRC scrambled by the Temporary C-RNTI is received, the UE 102 may use the first value and/or the second value to perform PUSCH transmission.

Namely, the third value may be used for PUSCH transmission unless the PUSCH transmission corresponds to the random access response grant or the PUSCH transmission corresponds to retransmission of the same transport block (i.e., the DCI format with CRC scrambled by the Temporary C-RNTI). Here, as described above, the PUSCH transmission that corresponds to the random access response grant may be performed as part of the random access procedure (e.g., the contention based random access procedure). Also, the PUSCH transmission that corresponds to retransmission of the same transport block (i.e., the DCI format with CRC scrambled by the Temporary C-RNTI) may be performed as part of the random access procedure (e.g., the contention based random access procedure). Here, as described above, the random access response grant may be included in the random access response (e.g., transmitted on the PDSCH) scheduled by using the DCI format with CRC scrambled by the RA-RNTI (e.g., the PDCCH with CRC scrambled by the RA-RNTI). Here, the DCI format with CRC scrambled by the RA-RNTI may be received (e.g., detected, monitored) in only a common search space (e.g., the CSS). Also, the DCI format with CRC scrambled by the Temporary C-RNTI may be received (e.g., detected, monitored) in only the CSS. Namely, the UE 102 may receive the DCI format with CRC scrambled by the RA-RNTI and/or the DCI format with CRC scrambled by the Temporary C-RNTI in only the CSS.

Also, the first value and/or the second value may be used for PUSCH transmission scheduled by using the DCI format 0_0 (e.g., fallback DCI). For example, the first value and/or the second value may be used for PUSCH transmission scheduled by using the DCI format 0_0 with CRC scrambled by the C-RNTI. Namely, in a case that the DCI format 0_0 with CRC scrambled by the C-RNTI, the UE 102 may use the first value and/or the second value to perform PUSCH transmission. Also, the first value and/or the second value may be used for PUSCH transmission scheduled by using the DCI format 0_0 with CRC scrambled by the CS-RNTI. Namely, in a case that the DCI format 0_0 with CRC scrambled by the C-RNTI and/or the CS-RNTI, the UE 102 may use the first value and/or the second value to perform PUSCH transmission. Here, the DCI format 0_0 may be received (e.g., detected, monitored) in the USS and/or the CSS.

Also, the first value and/or the second value may be used for PUSCH transmission scheduled by using the DCI format 0_0 received in the CSS. Namely, the first value and/or the second value may be used for only PUSCH transmission scheduled by using the DCI format 0_0 with CRC scrambled by the C-RNTI, which is received in the CSS. For example, in a case that the DCI format 0_0 with CRC scrambled by the C-RNTI is received in the CSS, the UE 102 may use the first value and/or the second value to perform PUSCH transmission. Also, the first value and/or the second value may be used for PUSCH transmission scheduled by using the DCI format 0_0 with CRC scrambled by the CS-RNTI received in the CSS. Namely, in a case that the DCI format 0_0 with CRC scrambled by the C-RNTI and/or the CS-RNTI is received in the CSS, the UE 102 may use the first value and/or the second value to perform PUSCH transmission.

Namely, the third value may be used for PUSCH transmission scheduled by using the DCI format 0_0 received in the USS. Namely, the third value may be used for PUSCH transmission scheduled by using the DCI format 0_0 with CRC scrambled by the C-RNTI, which is received in the USS. For example, in a case that the DCI format 0_0 with CRC scrambled by the C-RNTI is received in the USS, the UE 102 may use the third value to perform PUSCH transmission. Also, the third value may be used for PUSCH transmission scheduled by using the DCI format 0_0 with CRC scrambled by the CS-RNTI received in the USS. Namely, in a case that the DCI format 0_0 with CRC scrambled by the C-RNTI and/or the CS-RNTI is received in the USS, the UE 102 may use the first value to perform PUSCH transmission.

The relationship between K and aggregationFactorUL may be implemented in one or more of the following approaches. In some approaches, both K and aggregationFactorUL may have the same meaning. Both may be configured. For example, the UE 102 may follow K, or may ignore aggregationFactorUL. In another example, the UE 102 may follow aggregationFactorUL, or may ignore K. Alternatively, only one of K or aggregationFactorUL may be configured (e.g., K and aggregationFactorUL may not be configured at the same time for a given bandwidth part). For example, if K is configured, aggregationFactorUL may not be configured. In another example, if aggregationFactorUL is configured, K may not be configured.

As described above, the aggregationFactorUL may be configured in the PDCCH configuration. Here, the number of repetitions parameter (i.e., a value of K) may be configured in a configuration for the PUSCH (e.g., the PUSCH configuration included in the RMSI and/or the dedicated RRC message). And, in a case that the aggregationFactorUL and the number of repetitions parameter are configured (e.g., for the same time, and/or for the same PUSCH tranmission), the UE 102 may use the aggregationFactorUL (e.g., the value of the aggregationFactorUL) to perform the PUSCH transmission. Also, in a case that the aggregationFactorUL and the number of repetitions parameter are configured (e.g., at the same timing, and/or for the same PUSCH tranmission), the UE 102 may use the number of repetitions parameter (e.g., the value of K) to perform the PUSCH transmission. Also, the UE is not required to be configured with the aggregationFactorUL and the number of repetitions parameter (e.g., for the same time, for the same PUSCH transmission). Namely, the gNB 160 may not configure the aggregationFactorUL and the number of repetitions parameter (e.g., for the same time, for the same PUSCH transmission). Namely, the gNB 160 may configure either one of the aggregationFactorUL and the number of repetitions parameter (e.g., for a certain time, for a certain PUSCH transmission).

In some approaches, K and aggregationFactorUL may have different usages. In one example, K may be used for UL transmission without grant (e.g., PUSCH transmission based on the configured grant (e.g., Type 1 and/or Type 2)) while aggregationFactorUL may be used for grant-based transmission (e.g., PUSCH transmission scheduled by using the DCI format with CRC scrambled by the C-RNTI). In another example, K may be the number of real transmissions for repetitions, while aggregationFactorUL may be the number of transmission occasions for repetitions. In yet another example, aggregationFactorUL may be the number of real transmissions for repetitions, while K may be the number of transmission occasions for repetitions.

Given the time domain parameters listed above, transmission occasions for repetitions may be determined. Transmission occasions may be determined in accordance with one or more of the following approaches. In some approaches, the number of possible transmission occasions within a period may be fixed, no matter whether any transmission occasion is used for a real (e.g., an actual) transmission or not. Examples of a fixed number of possible transmission occasions are illustrated in connection with FIG. 3.

In some approaches, the number of possible transmission occasions within a period may be flexible. A transmission occasion may be located in any slot within the period and the number of transmission occasions may be greater than the number of repetitions (e.g., K=4) in a case that any occasion is missed, dropped or collided. Examples of a flexible number of possible transmission occasions are illustrated in connection with FIG. 4.

In some cases, there may be a mismatch between parameters. Some examples of parameter mismatch are given as follows. In some examples, periodicity may be given by symbols (e.g., 2 symbols or 7 symbols) while the time domain allocation field may be used to indicate start symbol and length (up to 14 symbols) within a slot. There may be several approaches to handle the time domain allocation field in this case. In some approaches, the time domain allocation field may be ignored. Other techniques (e.g., default time domain allocation) may be used to determine the time domain allocation within the symbol-based period. In some approaches, a different interpretation may be utilized for the time domain allocation field. In some approaches, partial values in a table for time domain allocation may be used. For example, SLIV with a length shorter than or equal to 7 may be used for the case with a periodicity as 7 symbols. In some approaches a different table for time domain allocation may be used. The table may be defined in a specification.

In some examples of parameter mismatch, the number of slots within a period may be less than the configured number of repetitions or aggregation factor. For instance, the periodicity for numerology of 15 kilohertz (kHz) may be 1 ms so that there is only 1 slot in a period, but K may be 2, 4, or 8. There may be several approaches to handle the mismatch. In some approaches, K or the aggregation factor field is ignored. Other techniques (e.g., default time domain allocation) may be used to determine the time domain allocation within the shorter period. In some approaches, the UE 102 is not expected to be configured with a value of K or the aggregation factor, which may be larger than the number of slots within a period. K or the aggregation factor, which may be less than or equal to the number of slots within a period, may be assigned to the UE 102. In some approaches, repetition may be (e.g., is always) terminated at the end of the period. In some approaches, the UE 102 may use the transmission occasion in the next period. In some approaches, the configured number of repetitions or aggregation factor may be used by grant-based transmission/retransmission.

The repetition number may be counted in accordance with one or more of the following approaches. One aspect may be when to start counting. In some approaches, the counting may start from the first real (e.g., actual) transmission. In some approaches, the counting may start from the first transmission occasion within a period. Another aspect may be how to count when conflicts (e.g., downlink (DL) symbols by slot format indicator (SFI), uplink control information (UCI) only, sounding reference signal (SRS), etc.) occur. In some approaches, the dropped, failed, or missed repetition may not be counted. In some approaches, the dropped, failed, or missed repetition is counted.

Examples of condition(s) for UCI piggyback on a configured grant are given as follows. Periodicity: whether to allow UCI piggyback on PUSCH given by configured grant may depend on the periodicity. In some approaches, UCI may be piggybacked on a PUSCH only when the periodicity is larger (or less) than a threshold (where the threshold may be fixed, configured by higher layer, and/or indicated by L1 signaling, for instance). Time domain allocation: whether to allow UCI piggyback on PUSCH given by a configured grant may depend on the time domain allocation. In some approaches, UCI may be piggybacked on PUSCH only when the length of mini-slot (or SLIV) is larger (or less) than a threshold (where the threshold may be fixed, configured by higher layer, and/or indicated by L1 signaling, for instance). Modulation and coding scheme (MCS) for configured grant: whether to allow UCI piggyback on PUSCH given by a configured grant may depend on the MCS. In some approaches, UCI may be piggybacked on PUSCH only when the MCS index is larger (or less) than a threshold (where the threshold may be fixed, configured by higher layer, and/or indicated by L1 signaling).

Here, UCI piggyback on PUSCH given by the configured grant may include UCI transmission on the PUSCH scheduled based on the configured grant. For example, in a case that UCI transmission (e.g., on the PUSCH and/or the PUCCH) collides with PUSCH transmission based on the configured grant, the UCI may be transmitted on PUSCH given by the configured grant. For example, in a case that UCI transmission and PUSCH transmission are overlapping, at least, in one symbol (e.g., one OFDM symbol), the UE 102 may use PUSCH (e.g., PUSCH resource) based on the configured grant to transmit UCI (e.g., UCI that is attempted to be transmitted on the PUCCH and/or the PUSCH).

Any other parameter for configured grant: whether to allow UCI piggyback on PUSCH given by a configured grant may depend on any other parameter for a configured grant. UCI content/type: whether to allow UCI piggyback on PUSCH given by a configured grant may depend on the UCI content/type. In some approaches, HARQ-ACK information bits may be piggybacked on PUSCH but channel state information (CSI) may not. Or, Type 1 CSI may be piggybacked on PUSCH but CSI Type 2 may not.

Bandwidth part (BWP) or carrier: whether to allow UCI piggyback on PUSCH given by configured grant may depend on the bandwidth part or carrier. In some approaches, UCI may (or may not) be piggybacked on a PUSCH associated with initial BWP or default BWP. Whether to allow UCI piggyback on PUSCH given by a configured grant may depend on the configuration of the bandwidth part or carrier. In some approaches, any combination of the foregoing conditions may be utilized.

Examples of conditions to use fallback DCI or non-fallback DCI for Type 2 activation are given as follows. Periodicity: whether to use fallback DCI or non-fallback DCI for Type 2 activation may depend on the periodicity. In some approaches, fallback DCI may be used for Type 2 activation only when the periodicity is larger (or less) than a threshold (where the threshold may be fixed, configured by higher layer, and/or indicated by L1 signaling, for instance). Time domain allocation: whether to use fallback DCI or non-fallback DCI for Type 2 activation may depend on the time domain allocation. In some approaches, fallback DCI may be used for Type 2 activation only when certain start symbol and length (e.g., all the 14 symbols in a slot) are used for time domain allocation. Any other parameter for configured grant: whether to use fallback DCI or non-fallback DCI for Type 2 activation may depend on any other parameter for configured grant. Bandwidth part (BWP) or carrier: whether to use fallback DCI or non-fallback DCI for Type 2 activation may depend on the bandwidth part or carrier. In some approaches, fallback DCI may be used for Type 2 activation only on initial BWP or default BWP. Whether to use fallback DCI or non-fallback DCI for Type 2 activation may depend on the configuration of the bandwidth part or carrier. In some approaches, any combination of the foregoing conditions may be utilized.

As described above, in new radio (NR), the UE 102 may support multiple types of uplink transmissions without grant (e.g., GF uplink transmission, GF transmission, and/or transmission by configured grant). A first type (Type 1) of GF transmission may be a UL data transmission without grant that may be only based on RRC (re)configuration without any L1 signaling. In a second type (Type 2) of GF transmission, UL data transmission without grant may be based on both RRC configuration and L1 signaling for activation/deactivation for UL data transmission without grant. An example for RRC configuration is shown in Listing 1.

Listing 1

```
-- ASN1START
-- TAG-SPS-CONFIG-START
-- SPS may be configured on the PCell as well as on SCell(s). But SPS may not be
configured for more than one serving cell of a cell group at once.
SPS-Config ::=                                          SEQUENCE {
    downlink                                            SEQUENCE {
        -- RNTI for DL SPS may correspond to L1 parameter 'SPS C-RNTI'
        sps-RNTI                                        RNTI-Value
        -- Periodicity for DL SPS
        -- May correspond to L1 parameter 'semiPersistSchedIntervalDL'
        periodicity                                     ENUMERATED {ms10, ms20, ms32,
ms40, ms64, ms80, ms128, ms160, ms320, ms640,
                                                                    spare6, spare5, spare4,
spare3, spare2, spare1}                                 OPTIONAL,
        -- Number of configured HARQ processes for SPS DL. May correspond to L1
parameter 'numberOfConfSPS-Processes'
        nrofHARQ-Processes                              INTEGER (1..8)
        -- HARQ resource for PUCCH for DL SPS.
        n1PUCCH-AN                                      CHOICE {
            format0                                     PUCCH-resource-config-PF0,
            format1                                     PUCCH-resource-config-PF1
```

Listing 1

```
            }
      },
      -- UL SPS configuration
      uplink                                              SEQUENCE {
            -- Closed control loop to apply. May correspond to L1 parameter 'PUSCH-
closed-loop-index'
            powerControlLoopToUse                         ENUMERATED {n0, n1},
            -- Index of the P0-PUSCH-AlphaSet to be used for this configuration
            p0-PUSCH-Alpha                                P0-PUSCH-AlphaSetId,
            -- Enable transformer precoder for type1 and type2. Absence indicates that it is
disabled.
            -- May correspond to L1 parameter 'UL-TWG-tp'
            transformPrecoder                             ENUMERATED {enabled}
            -- The number of HARQ processes configured. It applies for both Type 1 and
Type 2
            -- May correspond to L1 parameter 'UL-TWG-numbHARQproc'
            nrofHARQ-processes                            INTEGER(1..ffsValue)
            --   The number or repetitions of K:
            repK                                          ENUMERATED {n1, n2, n4, n8},
            -- If repetitions is used, this field indicates the redundancy version (RV)
sequence to use.
            -- May correspond to L1 parameter 'UL-TWG-RV-rep'
            repK-RV                                       ENUMERATED {s1-0231, s2-
0303, s3-0000}                                            OPTIONAL,
            -- Periodicity for UL transmission without UL grant for type 1 and type 2
            -- May correspond to L1 parameter 'UL-TWG-periodicity'
            -- The following periodicities may be supported depending on the configured
subcarrier spacing [ms]:
            --    15kHz: 2 symbols, 7 symbols, 1, 2, 5, 10, 20, 32, 40, 64, 80, 128, 160, 320,
640
            --    30kHz: 2 symbols, 7 symbols, 0.5, 1, 2, 5, 10, 20, 32, 40, 64, 80, 128, 160,
320, 640
            --    60kHz: 2 symbols, 7 symbols (6 symbols for ECP),
0.25,0.5,1,2,5,10,20,32, 40, 64, 80, 128, 160, 320, 640
            --    120kHz: 2 symbols, 7 symbols, 0.125,0.25,0.5,1,2,5,10,20, 32, 40, 64, 80,
128, 160, 320, 640 OPTIONAL,
            periodicity                                   ENUMERATED {sym2, sym7,
ms0dot125, ms0dot25, ms0dot5, ms1, ms2, ms5, ms10, ms20,
                                                                ms32, ms40, ms64,
ms80, ms128, ms160, ms320, ms640]                         OPTIONAL,
            -- May indicate which MCS table the UE may use for PUSCH without transform
precoder
            -- May correspond to L1 parameter 'MCS-Table-PUSCH'
            -- When the field is absent the UE applies the value 64QAM
            mcs-Table                                     ENUMERATED {qam64, qam256],
            -- Indicates which MCS table the UE may use for PUSCH with transform
precoding
            -- May correspond to L1 parameter 'MCS-Table-PUSCH-transform-precoding'
            -- When the field is absent the UE applies the value 64QAM
            mcs-TableTransformPrecoder                    ENUMERATED {qam64, qam256],
            -- Selection between config 1 and config 2 for RBG size for PUSCH. May
correspond to L1 parameter 'RBG-size-PUSCH'
            rbg-Size                                      ENUMERATED {config1, config2],
            -- Selection between and configuration of dynamic and semi-static beta-offset
            -- May correspond to L1 parameter 'UCI-on-PUSCH'
            uci-on-PUSCH                                  SetupRelease { CHOICE {
                  dynamic                                       SEQUENCE (SIZE (1..4))
OF BetaOffsets,
                  semiStatic                                    BetaOffsets
            }  }
            -- Enables intra-slot frequency hopping with the given frequency hopping
offset
            -- May correspond to L1 parameter 'UL-TWG-hopping'
            -- Configured one of two supported frequency hopping modes. If not
configured frequency hopping is not configured
            -- May correspond to L1 parameter 'Frequency-hopping-PUSCH'
            -- When the field is absent the UE applies the value Not configured
            frequencyHopping                              ENUMERATED {mode1, mode2},
            dmrs-Uplink                                   SEQUENCE {
                        -- Selection of the DMRS type may be used for UL
                        dmrs-Type                         ENUMERATED {type1, type2}
      -- Position for additional DM-RS in DL
      -- The four values represent the cases of 1+0, 1+1, 1+1+1. 1+1+1+1 non-adjacent
OFDM symbols for DL.
            dmrs-AdditionalPosition                       ENUMERATED {pos0, pos1, pos2,
pos3}                                                     OPTIONAL,      -- Need R
      -- Configures uplink PTRS
```

Listing 1

```
    phaseTracking-RS                            SetupRelease { Uplink-PTRS-Config }
    -- The maximum number of OFDM symbols for UL front loaded DMRS.
    -- May correspond to L1 parameter 'UL-DMRS-max-len'
    maxLength                                   ENUMERATED {len1, len2}
If CP-OFDM and DFT-S-OFDM cannot be configured simultaneously, the two blocks
below may be a CHOICE
    -- DMRS related parameters for Cyclic Prefix OFDM
    cp-OFDM                                     SEQUENCE {
        -- UL DMRS scrambling initalization for CP-OFDM
        -- May correspond to L1 parameter 'UL-DMRS-Scrambling-ID'
        -- When the field is absent the UE applies the value Physical cell ID + 6 fixed
bits (e.g. 000000)
        scramblingID                            BIT STRING (SIZE (16))
    },
    -- DMRS related parameters for DFT-s-OFDM (Transform Precoding)
    dft-S-OFDM                                  SEQUENCE {
        -- Parameter: N_ID^(csh_DMRS) for DFT-s-OFDM DMRS
        -- May correspond to L1 parameter 'nDMRS-CSH-Identity-Transform-
precoding'
        nDMRS-CSH-Identity                      INTEGER(0..1007)
        -- Parameter: N_ID^(PUSCH) for DFT-s-OFDM DMRS
        -- May correspond to L1 parameter 'nPUSCH-Identity-Transform precoding'
        nPUSCH-Identity                         INTEGER(0..1007)
        -- Sequence-group hopping for PUSCH can be disabled for a certain UE
despite being enabled on a cell basis. For DFT-s-OFDM DMRS
        -- May correspond to L1 parameter 'Disable-sequence-group-hopping-
Transform-precoding'
        disableSequenceGroupHopping             ENUMERATED {disabled}
        -- Determines if sequence hopping is enabled or not. For DFT-s-OFDM DMRS
        -- May correspond to L1 parameter 'Sequence-hopping-enabled-Transform-
precoding'
        sequenceHoppingEnabled                  ENUMERATED {enabled}
        -- Orthogonal Cover Code (OCC) for DFT-s-OFDM DMRS
        -- May correspond to L1 parameter 'Activate-DMRS-with OCC-Transform-
precoding'
        activateDMRS-WithOCC                    ENUMERATED {enabled}
        -- CS for the ZC sequence. For DFT-s-OFDM DMRS
        -- May correspond to L1 parameter 'CyclicShift-Transform-precoding'
        cyclicShift                             INTEGER (0..7)
        -- Parameter: Delta_ss for sequence shift pattern. For DFT-s-OFDM DMRS
        -- May correspond to L1 parameter 'groupAssignmentPUSCH-Transform-
precoding'
        -- When the field is absent the UE applies the value 'CellID mod 30'
        groupAssignmentPUSCH                    INTEGER (0..29)
    }
    -- Configuration of resource allocation type 0 and resource allocation type 1 for
non-fallback DCI
    -- May correspond to L1 parameter 'Resouce-allocation-config'
    resourceAllocation                          CHOICE {
        resourceAllocationType0                     NULL,
        resourceAllocationType1                     NULL,
        dynamicSwitch                               NULL
    }
    -- UL-SPS transmission with fully RRC-configured UL grant (Type1)
    -- If not provided or set to release, use UL-SPS transmission with UL grant
configured by DCI addressed to SPS-RNTI (Type2).
    rrcConfiguredUplinkGrant                    CHOICE {
        setup                                   SEQUENCE {
            -- May merge the following two into one. May not use "periodicity" for
rrcConfiguredUplinkGrant
            timeDomainOffset                    ENUMERATED
{ffsTypeAndValue},
            timeDomainAllocation                ENUMERATED
{ffsTypeAndValue}, -- RAN1 indicated just "Mapping-type,Index-start-len"
            frequencyDomainAllocation                   ENUMERATED
{ffsTypeAndValue},
            mcsAndTBS                                   INTEGER (0..31),
                frequencyHopping                            SetupRelease {
        },
        release                         NULL
    }
```

-continued

Listing 1

```
        OPTIONAL -- Need M
      }
        OPTIONAL -- Need M
}
-- TAG-SPS-CONFIG-STOP
-- ASN1STOP
```

For Type 2, PDCCH activation may be utilized. Listing 2 and Listing 3 show examples of DCI format 0_0 (e.g., fallback DCI) and format 0_1, which may be used for activation.

Listing 2

```
Identifier for DCI formats - [1] bit
Frequency domain resource assignment
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 1 bit for UEs configured with SUL in the cell
and the number of bits for DCI format 1_0 before padding is larger
than the number of bits for DCI format 0_0 before padding; 0 bit
otherwise.
```

Listing 3

```
Carrier indicator - 0 or 3 bits
    UL/SUL indicator - 0 bit for UEs not configured with SUL in the
cell or UEs configured with SUL in the cell but only PUCCH carrier
in the cell is configured for PUSCH transmission; 1 bit for UEs
configured with SUL in the cell
    Identifier for DCI formats - [1] bit
    Bandwidth part indicator - 0, 1 or 2 bits. The bitwidth for this field
is determined according to the higher layer parameter BandwidthPart-
Config for the PUSCH.
    Frequency domain resource assignment
    Time domain resource assignment - 0, 1, 2, 3, or 4 bits. The
bitwidth for this field is determined as [log_2(I)] bits, where I the number
of rows in the higher layer parameter [pusch-symbolAllocation].
    VRB-to-PRB mapping - 0 or 1 bit
    Frequency hopping flag - 0 or 1 bit
    New data indicator - 1 bit
    Redundancy version - 2 bits
    HARQ process number - 4 bits
    1st downlink assignment index - 1 or 2 bits
    2nd downlink assignment index - 0 or 2 bits
    TPC command for scheduled PUSCH - 2 bits
    SRS resource indicator
    Precoding information and number of layers - number of bits
determined by the following:
    Antenna ports - number of bits determined by the following
        SRS request - 2 bits for UEs not configured with SUL in the cell;
3 bits for UEs configured SUL in the cell where the first bit is the
non-SUL/SUL indicator and the second and third bits are defined
        CSI request - 0, 1, 2, 3, 4, 5, or 6 bits determined by higher
layer parameter ReportTriggerSize.
        CBG transmission information (CBGTI) - 0, 2, 4, 6, or 8 bits
determined by higher layer parameter
maxCodeBlockGroupsPerTransportBlock for PUSCH.
        PTRS-DMRS association - number of bits determined as follows
        beta_offset indicator - 0 if the higher layer parameter dynamic in
uci-on-PUSCH is not configured; otherwise 2 bits.
        DMRS sequence initialization - 0 if the higher layer
parameter PUSCH-tp = Enabled or 1 bit if the higher layer parameter
PUSCH-tp = Disabled for $n_{SCID}$ selection.
```

For configured grant Type 1 and Type 2 UL transmissions, a UE 102 may be configured with one or more parameters. In some approaches, the UE 102 may be configured with UE-specific RRC signaling separately from an associated RRC parameter for a grant-based transmission. As follows, examples of the one or more parameters are given: dmrs-Type: ENUMERATED {type1, type2}, FrequencyHopping: ENUMERATED {mode1, mode2}, dmrs-AdditionalPosition: ENUMERATED {pos0, pos1, pos2, pos3}, DMRS-Length: ENUMERATED {len1, len2}, and/or phaseTracking-RS. In some approaches, DMRSLength may be referred to as "maxLength" in PUSCH-Config. If maxLength is configured as len2, single- or double-symbol DM-RS may be indicated dynamically by DCI. For a configured grant Type 1, DMRS length may be configured len1 or len2.

Further examples of the one or more parameters are given as follows: for dft-S-OFDM: nDMRS-CSH-Identity: INTEGER(0 . . . 1007), scramblingID BIT STRING (SIZE (16)) for cp-OFDM; nPUSCH-Identity: INTEGER(0 . . . 1007), disableSequenceGroupHopping: ENUMERATED {disabled}, sequenceHoppingEnabled: ENUMERATED {enabled}, cyclicShift: INTEGER (0 . . . 7), activateDMRS-WithOCC: ENUMERATED {enabled}, groupAssignment-PUSCH: INTEGER (0 . . . 29), mcs-TableTransformPrecoder: ENUMERATED {64QAM, 256QAM}, mcs-Table: ENUMERATED {64QAM, 256QAM}, and/or uci-on-PUSCH: CHOICE {dynamic EQUENCE (SIZE (1 . . . 4)) OF BetaOffsets, semiStatic BetaOffsets}. For a Type 1 UL data transmission without grant, "uci-on-PUSCH" may be "semiStatic BetaOffsets" in some approaches. In some approaches, UCI on PUSCH for a configured grant is supported.

In some approaches, the parameter resourceAllocation may be defined as: CHOICE {resourceAllocationType0, resourceAllocationType1, dynamicSwitch}. For Type 1 UL data transmission without grant, "resourceAllocation" may be semiStatic "resourceAllocationType0" or "resourceAllocationType1." The parameter rbg-Size may be: ENUMERATED {config1, config2}. The parameter rbg-size may be used when the transformPrecoder parameter is disabled.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first gNB-decoded signal 164 may comprise received payload data, which may be stored in a data buffer 162. A second gNB-decoded signal 168 may comprise overhead data and/or control data. For example, the second gNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB signaling module 194. The gNB signaling module 194 may perform handle (e.g., receive) uplink transmissions without grant as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches.

FIG. 2 illustrates examples of a fixed period boundary and a flexible period boundary. In particular, the upper example includes a frame structure with a fixed period boundary for some approaches of uplink transmission without grant. For instance, the start slot index of a period is a multiple of period P.

The lower example includes a frame structure with a flexible period boundary for some approaches of uplink transmission without grant. For instance, the start slot index of a period is the same as the resource given by a configured grant.

Figure 3:
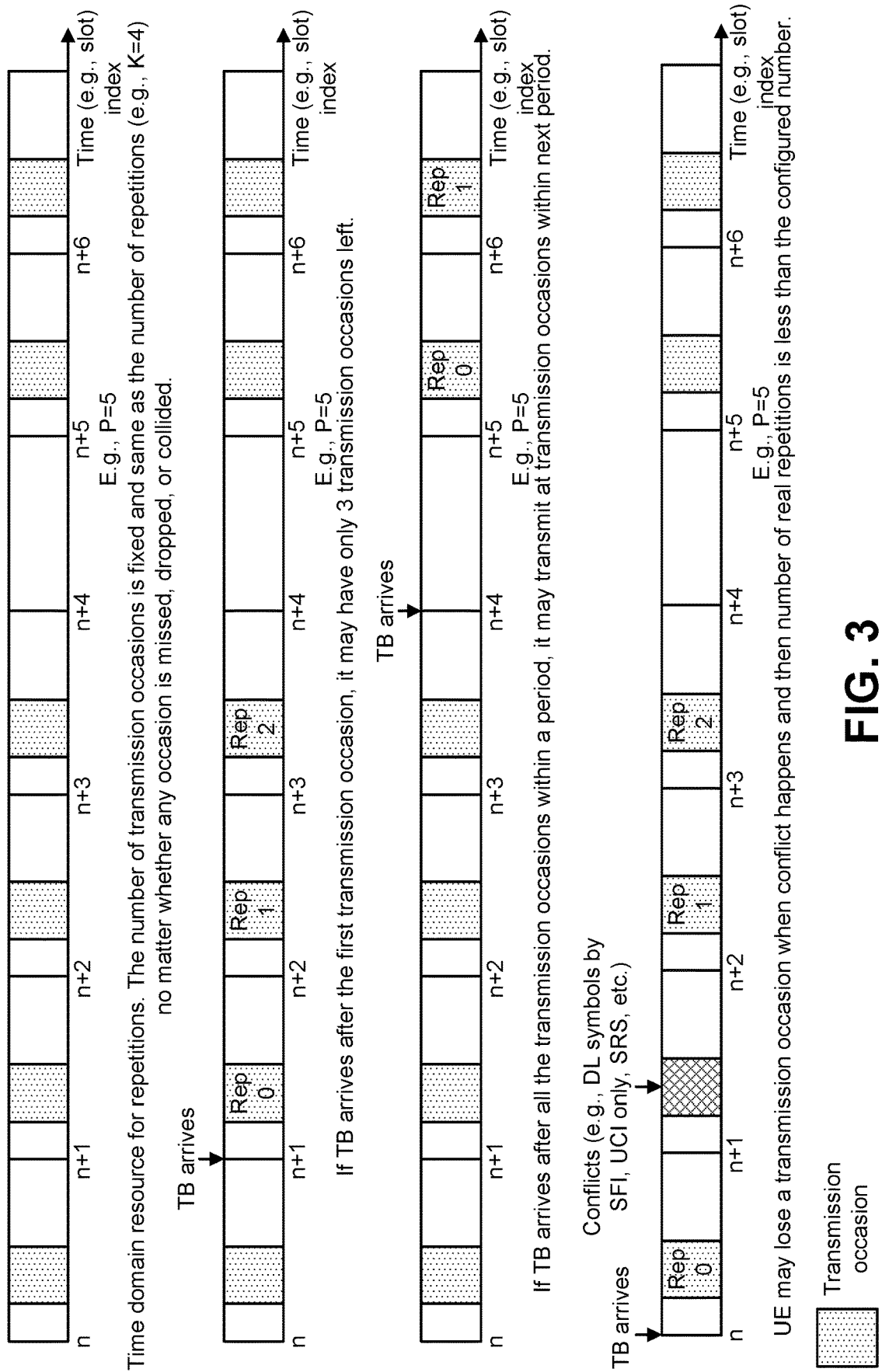
FIG. 3 illustrates examples of a time domain resource for repetitions.

FIG. 3 illustrates examples of a time domain resource for repetitions. In particular, the first (top) example includes a frame structure with a fixed number of transmission occasions. For instance, the number of transmission occasions may be fixed and same as the number of repetitions (e.g., K=4), no matter whether any occasion is missed, dropped, or collided.

The second example includes a frame structure with a number of transmission occasions. For instance, if the TB arrives after the first transmission occasion, there may be only 3 transmission occasions left.

The third example includes a frame structure with a number of transmission occasions. For instance, if the TB arrives after all the transmission occasions within a period, transmission may be performed at transmission occasions within a next period.

The fourth (bottom) example includes a frame structure with a number of transmission occasions. For instance, the UE 102 may lose a transmission occasion when conflict occurs, and then the number of real (e.g., actual) repetitions is less than the configured number.

Figure 4:
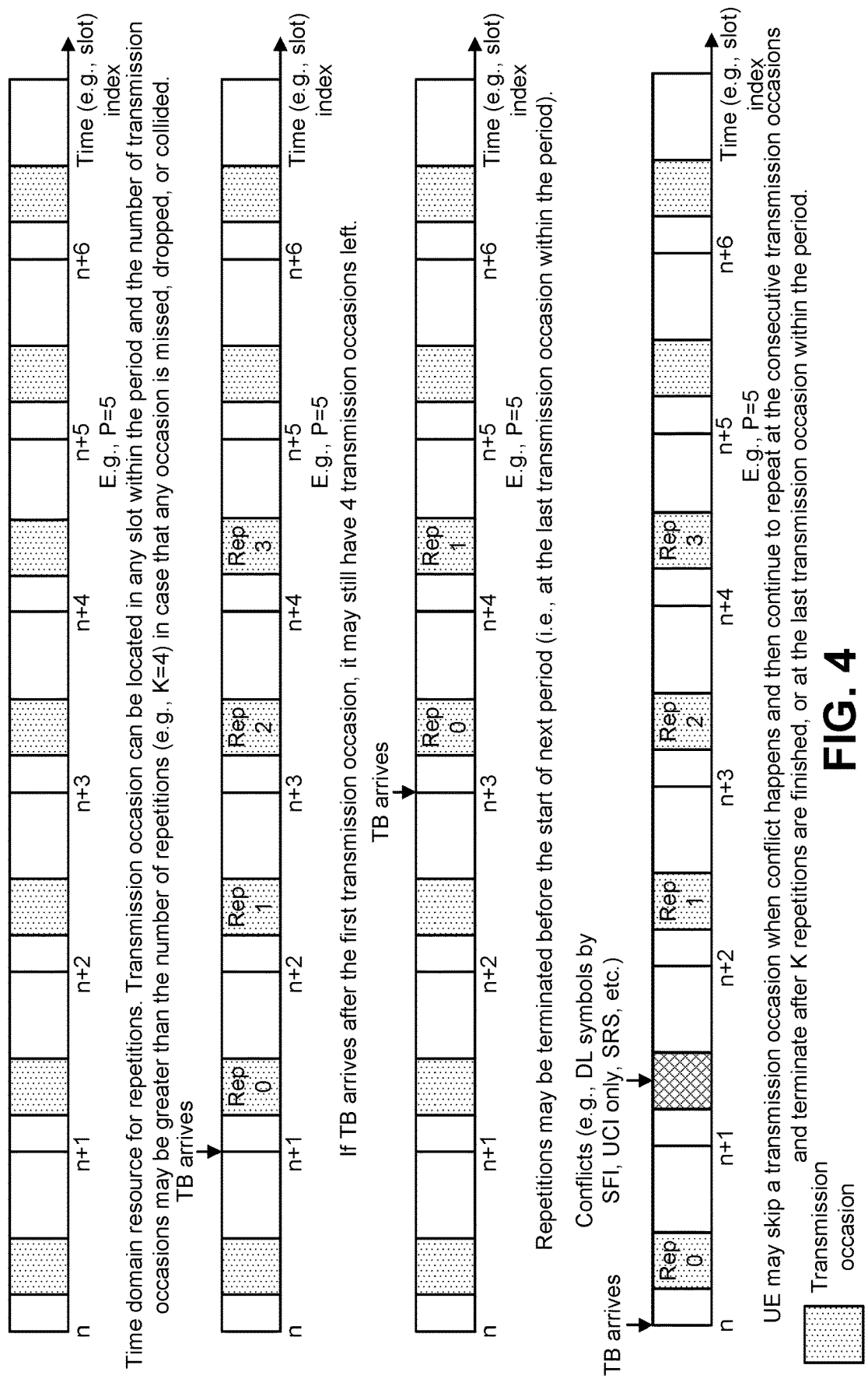
FIG. 4 illustrates other examples of a time domain resource for repetitions.

FIG. 4 illustrates other examples of a time domain resource for repetitions. In particular, the first (top) example includes a frame structure with a flexible number of transmission occasions. For instance, the transmission occasion can be located in any slot within the period and the number of transmission occasions may be greater than the number of repetitions (e.g., K=4) in case that any occasion is missed, dropped, or collided.

The second example includes a frame structure with a number of transmission occasions. For instance, if the TB arrives after the first transmission occasion, there may still be 4 transmission occasions left.

The third example includes a frame structure with a number of transmission occasions. For instance, repetitions may be terminated before the start of a next period (e.g., at the last transmission occasion within the period).

The fourth (bottom) example includes a frame structure with a number of transmission occasions. For instance, the UE 102 may skip a transmission occasion when conflict occurs and then continue to repeat at the consecutive transmission occasions and terminate after K repetitions are finished, or at the last transmission occasion within the period.

Figure 5:
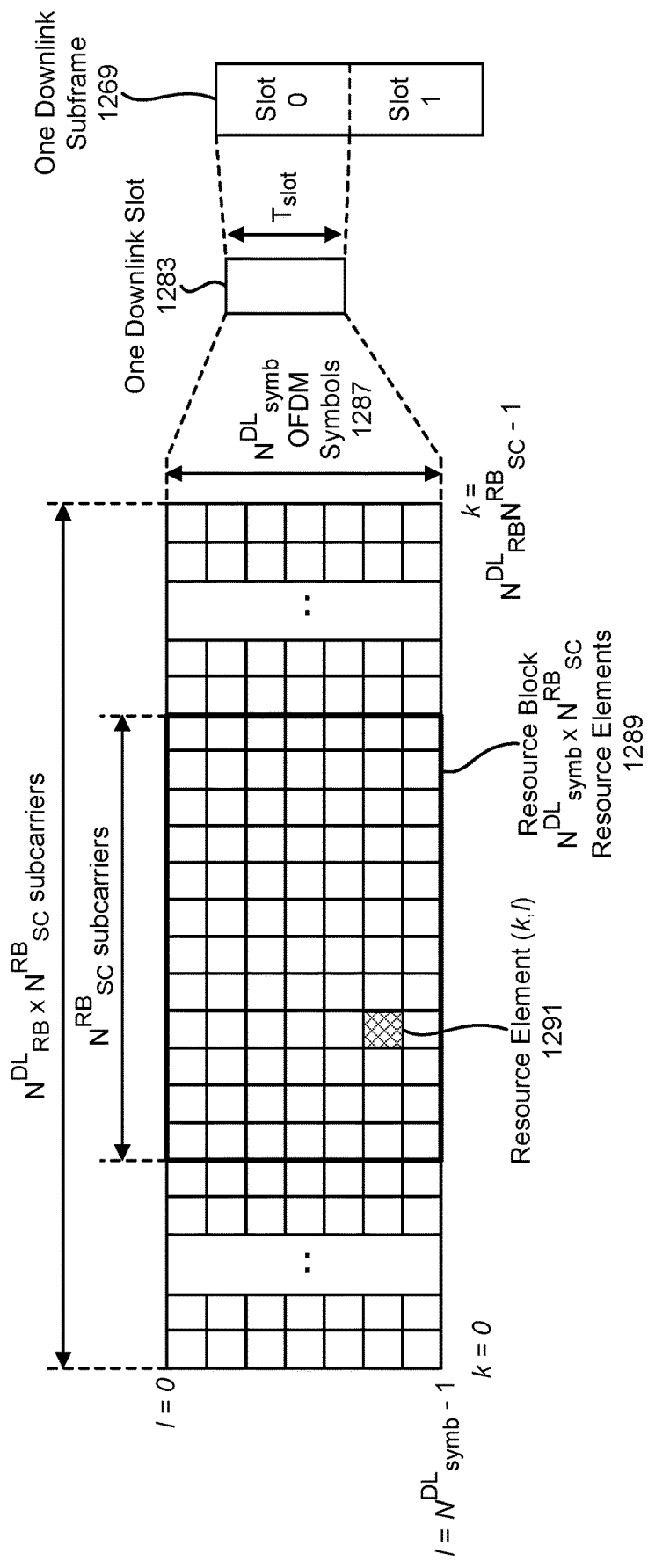
FIG. 5 is a diagram illustrating one example of a resource grid for the downlink.

FIG. 5 is a diagram illustrating one example of a resource grid for the downlink. The resource grid illustrated in FIG. 5 may be utilized in some implementations of the systems and methods disclosed herein. More detail regarding the resource grid is given in connection with FIG. 1.

In FIG. 5, one downlink subframe 1269 may include two downlink slots 1283. $N^{DL}_{RB}$ is downlink bandwidth configuration of the serving cell, expressed in multiples of $N^{RB}_{SC}$, where $N^{RB}_{SC}$ is a resource block 1289 size in the frequency domain expressed as a number of subcarriers, and $N^{DL}_{symb}$ is the number of OFDM symbols 1287 in a downlink slot 1283. A resource block 1289 may include a number of resource elements (RE) 1291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 1291 may be the RE 1291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 6:
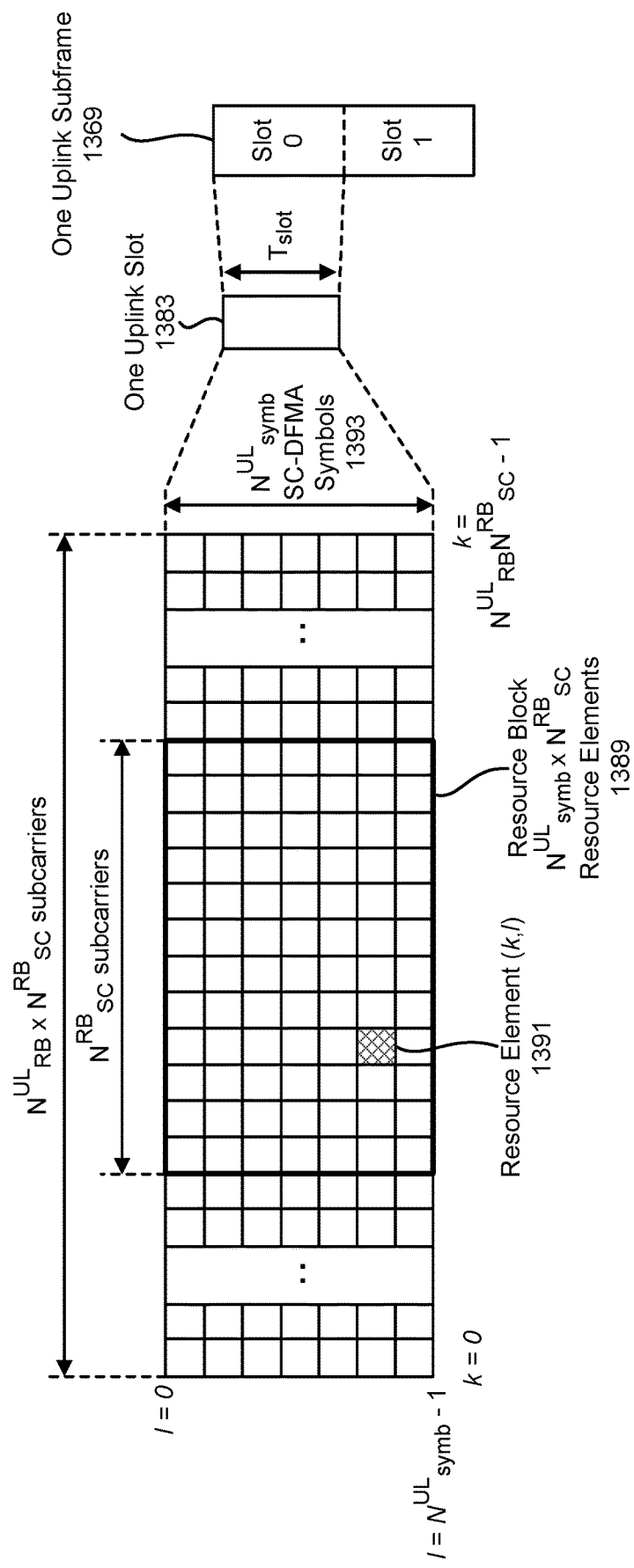
FIG. 6 is a diagram illustrating one example of a resource grid for the uplink.

FIG. 6 is a diagram illustrating one example of a resource grid for the uplink. The resource grid illustrated in FIG. 6 may be utilized in some implementations of the systems and methods disclosed herein. More detail regarding the resource grid is given in connection with FIG. 1.

In FIG. 6, one uplink subframe 1369 may include two uplink slots 1383. $N^{UL}_{RB}$ is uplink bandwidth configuration of the serving cell, expressed in multiples of $N^{RB}_{SC}$, where $N^{RB}_{SC}$ is a resource block 1389 size in the frequency domain expressed as a number of subcarriers, and $N^{UL}_{symb}$ is the number of SC-FDMA symbols 1393 in an uplink slot 1383. A resource block 1389 may include a number of resource elements (RE) 1391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 7:
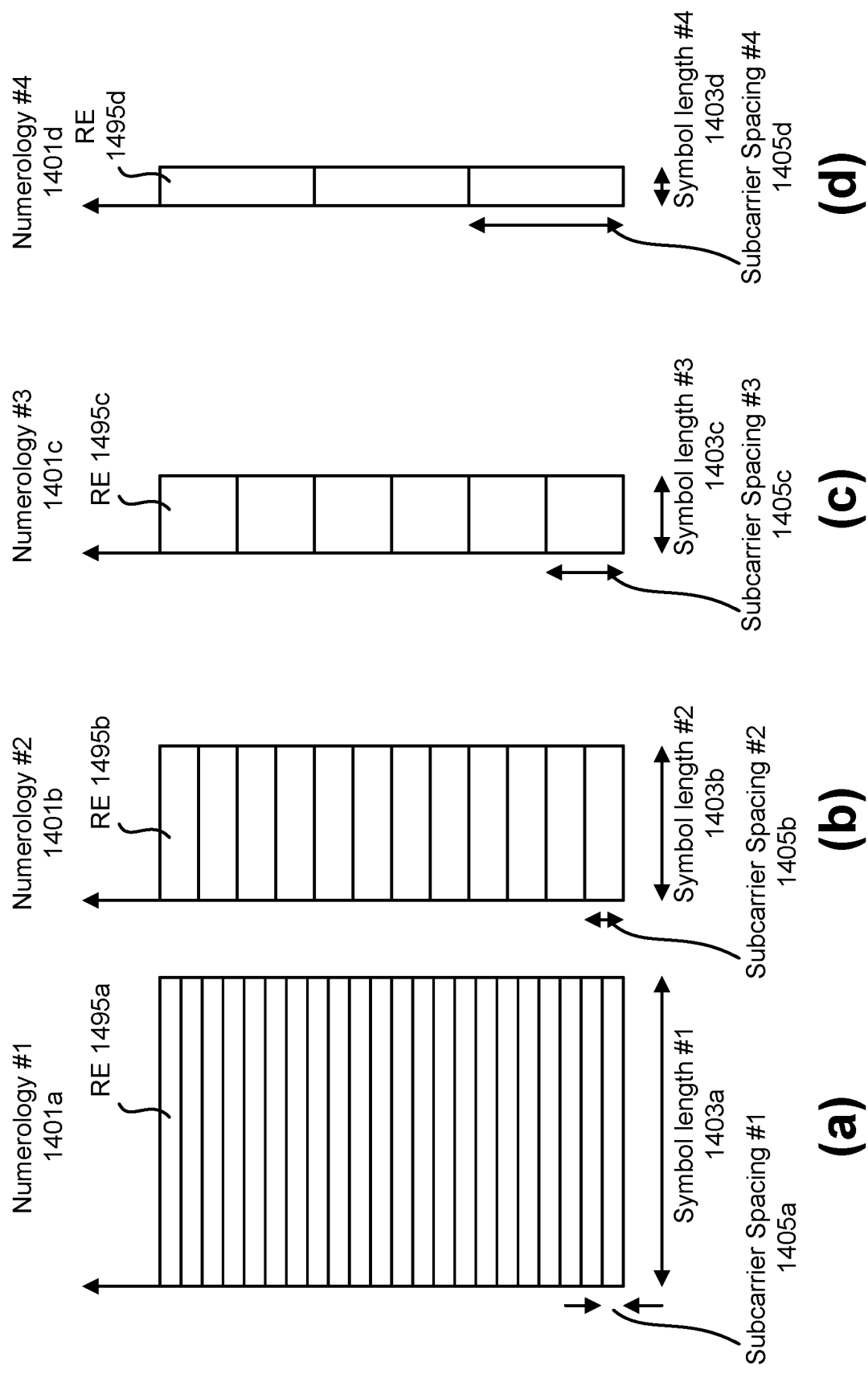
FIG. 7 shows examples of several numerologies.

FIG. 7 shows examples of several numerologies 1401. The numerology #1 1401a may be a basic numerology (e.g., a reference numerology). For example, a RE 1495a of the basic numerology 1401a may be defined with subcarrier spacing 1405a of 15 kHz in frequency domain and 2048Ts+ CP length (e.g., 160Ts or 144Ts) in time domain (i.e., symbol length #1 1403a), where Ts denotes a baseband sampling time unit defined as 1/(15000*2048) seconds. For the i-th numerology, the subcarrier spacing 1405 may be equal to $15*2^i$ and the effective OFDM symbol length $2048*2^{-i}$*Ts. It may cause the symbol length is $2048*2^{-i}$*Ts+CP length (e.g., $160*2^{-i}$*Ts or $144*2^{-i}$*Ts). In other words, the subcarrier spacing of the i+1-th numerology is a double of the one for the i-th numerology, and the symbol length of the i+1-th numerology is a half of the one for the i-th numerology. FIG. 7 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 8:
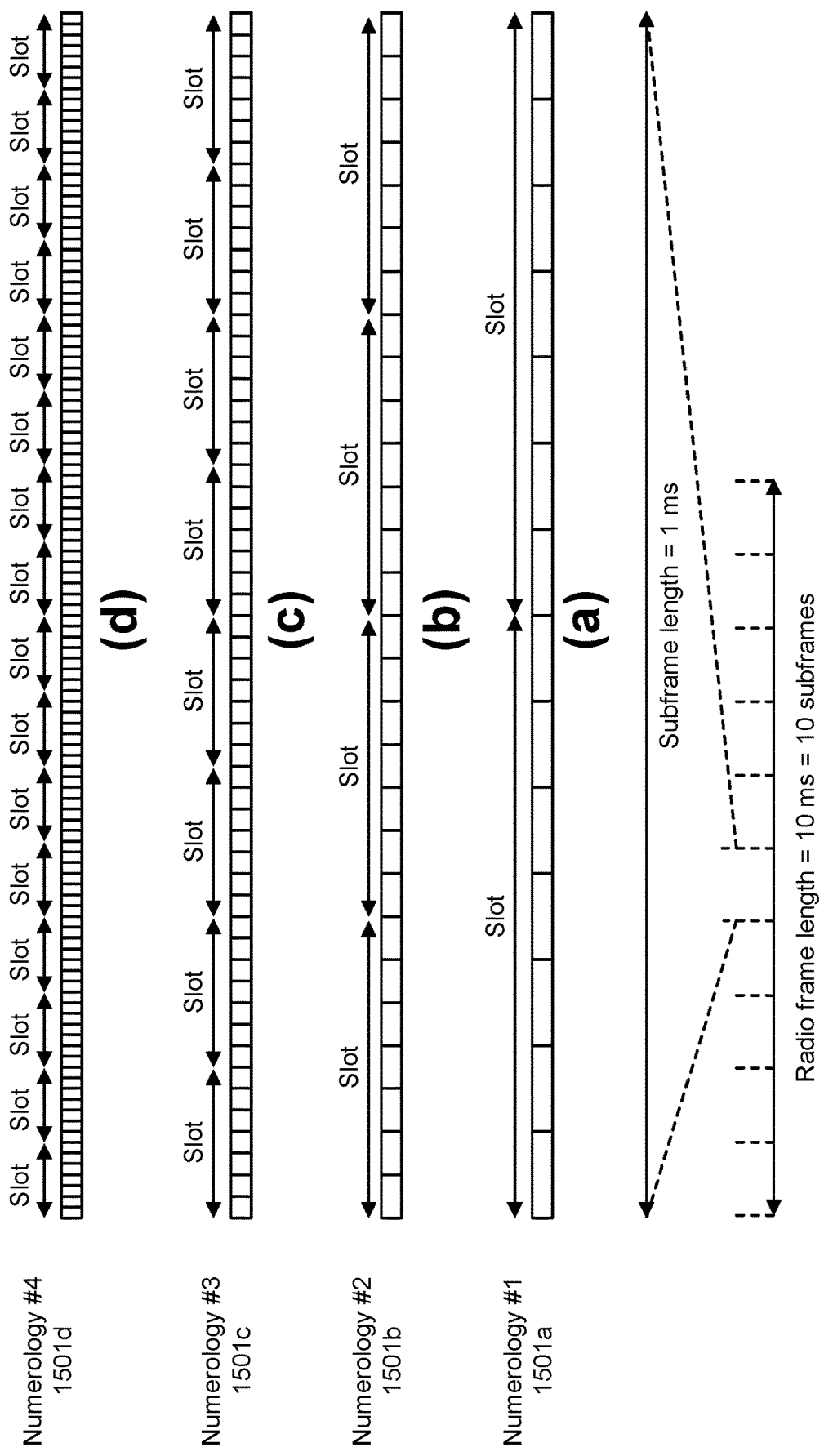
FIG. 8 shows examples of subframe structures for the numerologies.

FIG. 8 shows examples of subframe structures for the numerologies 1501 that are shown in FIG. 7. Given that a slot 1283 includes $N^{DL}_{symb}$ (or $N^{UL}_{symb}$)=7 symbols, the slot length of the i+1-th numerology 1501 is a half of the one for the i-th numerology 1501, and eventually the number of slots 1283 in a subframe (i.e., 1 ms) becomes double. It may be noted that a radio frame may include 10 subframes, and the radio frame length may be equal to 10 ms.

Figure 9:
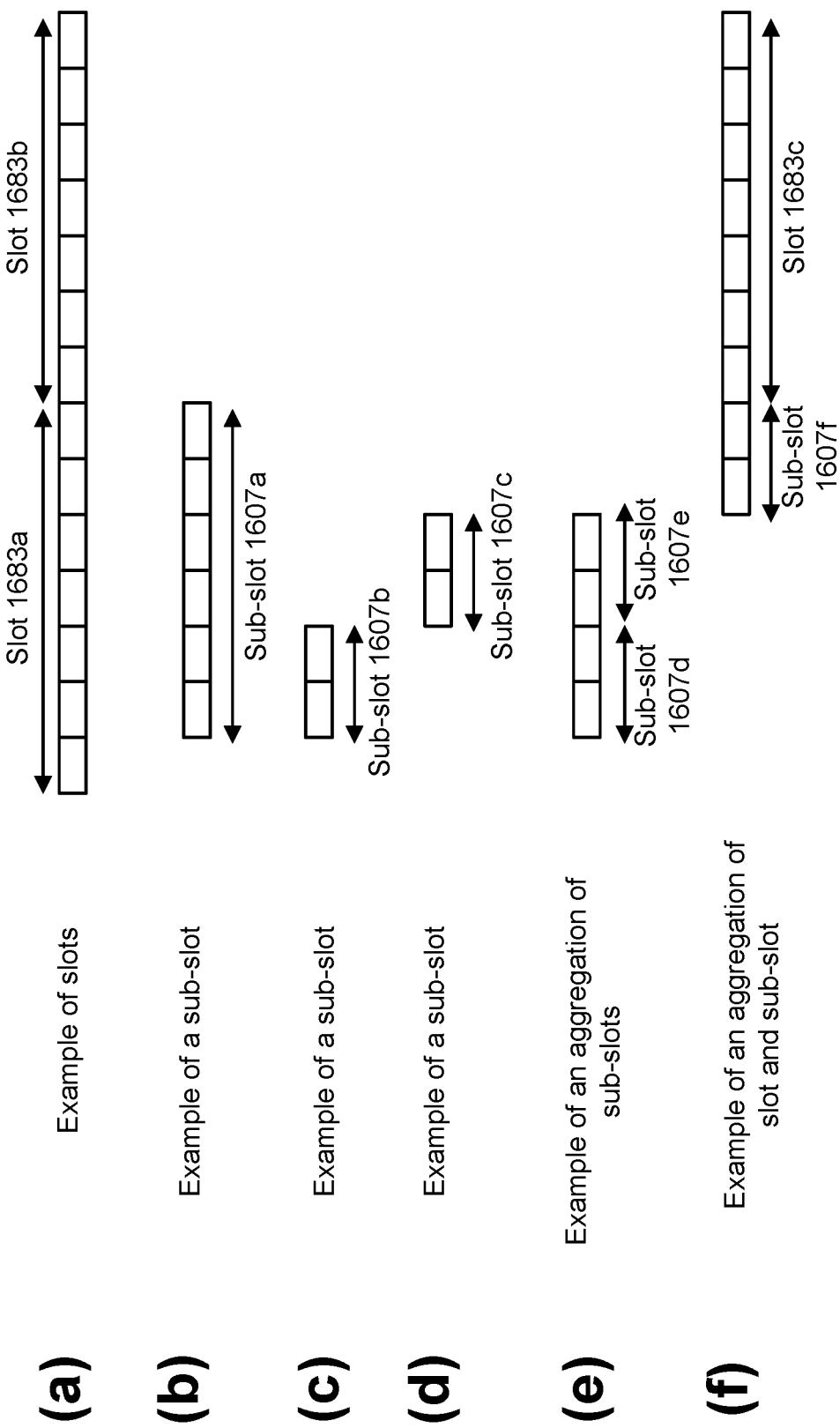
FIG. 9 shows examples of slots and sub-slots.

FIG. 9 shows examples of slots 1683 and sub-slots 1607. If a sub-slot 1607 is not configured by higher layer, the UE 102 and the eNB/gNB 160 may only use a slot 1683 as a scheduling unit. More specifically, a given transport block may be allocated to a slot 1683. If the sub-slot 1607 is configured by higher layer, the UE 102 and the eNB/gNB 160 may use the sub-slot 1607 as well as the slot 1683. The sub-slot 1607 may include one or more OFDM symbols. The maximum number of OFDM symbols that constitute the sub-slot 1607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1607 may start at any symbol within a slot 1683 unless it collides with a control channel. There could be restrictions of mini-slot length based on restrictions on starting position. For example, the sub-slot 1607 with the length of $N^{DL}_{symb}-1$ (or $N^{UL}_{symb}-1$) may start at the second symbol in a slot 1683. The starting position of a sub-slot 1607 may be indicated by a physical layer control channel (e.g., by DCI format). Alternatively, the starting position of a sub-slot 1607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1607.

In cases when the sub-slot 1607 is configured, a given transport block may be allocated to either a slot 1683, a sub-slot 1607, aggregated sub-slots 1607 or aggregated sub-slot(s) 1607 and slot 1683. This unit may also be a unit for HARQ-ACK bit generation.

Figure 10:
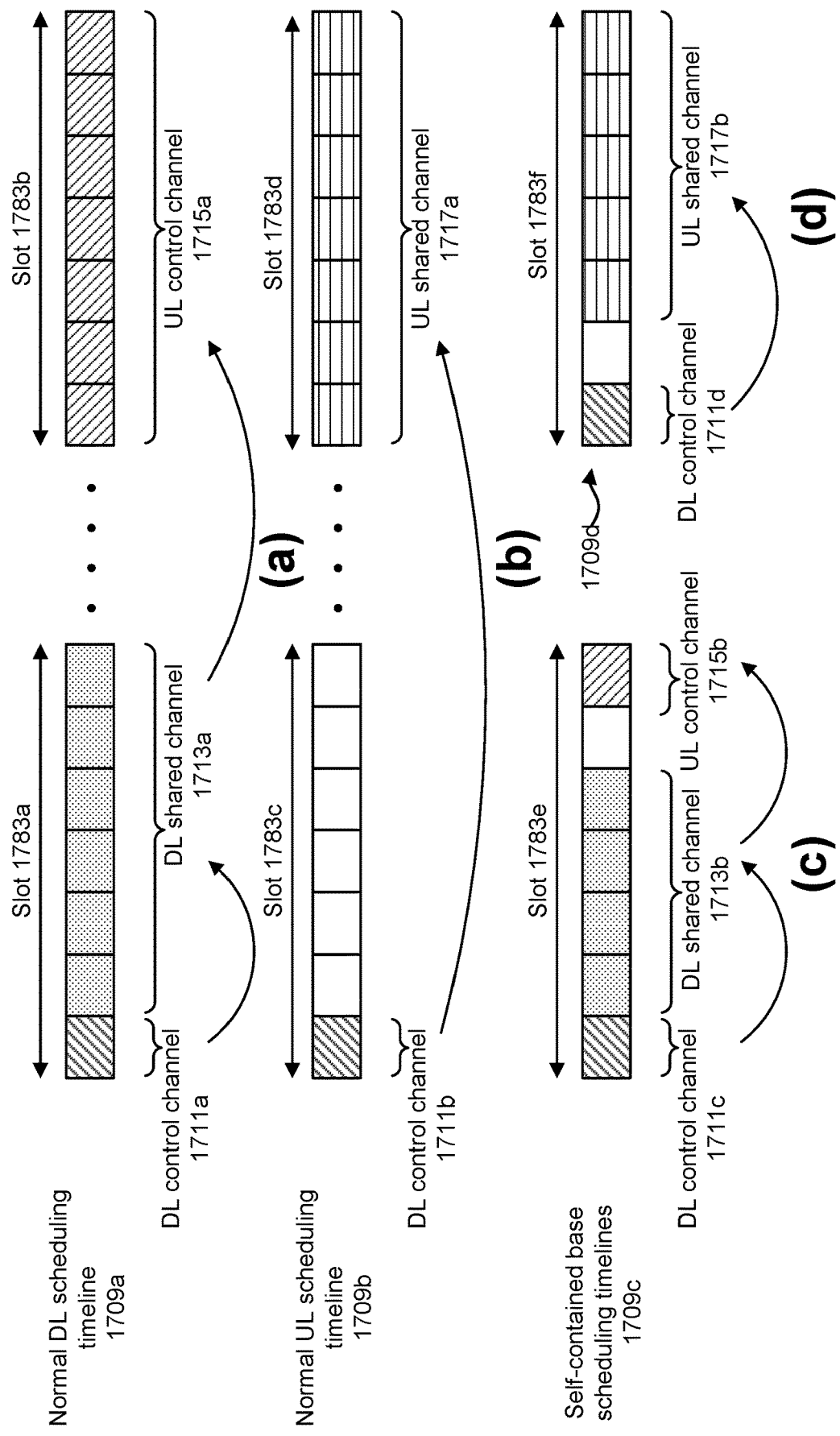
FIG. 10 shows examples of scheduling timelines.

FIG. 10 shows examples of scheduling timelines 1709. For a normal DL scheduling timeline 1709a, DL control channels are mapped the initial part of a slot 1783a. The DL control channels 1711 schedule DL shared channels 1713a in the same slot 1783a. HARQ-ACKs for the DL shared channels 1713a (i.e., HARQ-ACKs each of which indicates whether or not transport block in each DL shared channel 1713a is detected successfully) are reported via UL control channels 1715a in a later slot 1783b. In this instance, a given slot 1783 may contain either one of DL transmission and UL transmission.

For a normal UL scheduling timeline 1709b, DL control channels 1711b are mapped the initial part of a slot 1783c. The DL control channels 1711b schedule UL shared channels 1717a in a later slot 1783d. For these cases, the association timing (time shift) between the DL slot 1783c and the UL slot 1783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1709c, DL control channels 1711c are mapped to the initial part of a slot 1783e. The DL control channels 1711c schedule DL shared channels 1713b in the same slot 1783e. HARQ-ACKs for the DL shared channels 1713b are reported in UL control channels 1715b, which are mapped at the ending part of the slot 1783e.

For a self-contained base UL scheduling timeline 1709d, DL control channels 1711d are mapped to the initial part of a slot 1783f. The DL control channels 1711d schedule UL shared channels 1717b in the same slot 1783f. For these cases, the slot 1783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 11:
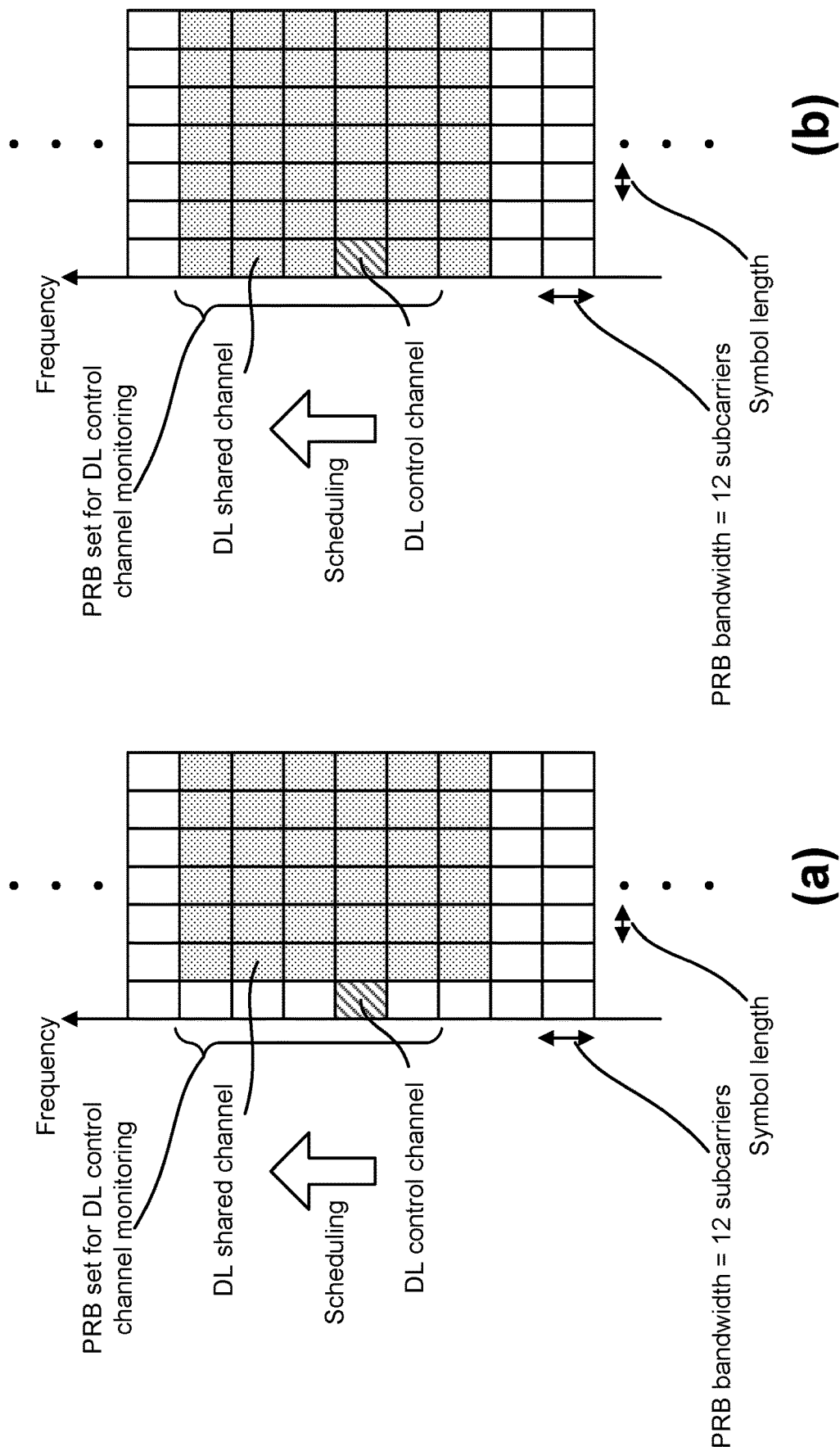
FIG. 11 shows examples of DL control channel monitoring regions.

FIG. 11 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

For example, the UE 102 may monitor a set of candidates of the DL control channel(s) in the control resource set (e.g., the CORESET). Here, the candidates of DL control channel (s) may be candidates for which the DL control channel(s) may possibly be mapped, assigned, and/or transmitted. For example, a candidate of the DL control channel(s) is composed of one or more control channel elements (CCEs). Here, the term "monitor" means that the UE 102 attempts to decode each DL control channel(s) in the set of candidates of the DL control channel(s) in accordance with all the DCI format(s) to be monitored. Namely, the UE 102 may monitor (e.g., receive, detect) the DCI format(s) in the DL control channel monitoring regions.

Here, a RNTI(s) assigned (e.g., by the gNB 160) to the UE 102 may be used for transmission of DCI (e.g., the DCI format(s), DL control channel(s) (e.g., the PDCCH(s)). Namely, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. Namely, the UE 102 detects DL control channel (e.g., the PDCCH, the DCI, the DCI format(s)) based on the blind decoding. That is, the UE 102 may decode the DL control channel(s) with the CRC scrambled by the RNTI(s). Namely, the UE 102 may decode the DCI format(s) with the CRC scrambled by the RNTI(s). In other words, the UE 102 may monitor the DL control channel(s) with the CRC scrambled by the RNTI(s). Namely, the UE 102 may monitor the DCI format(s) with the CRC scrambled by the RNTI Also, the UE 102 may detect the DCI format(s) in a USS (i.e., a UE-specific search space) and/or a CSS (i.e., a common search space).

Here, the RNTI(s) may include C-RNTI (Cell-RNTI), CS-RNTI (Configured Scheduling RNTI), SI-RNTI (System Information RNTI), P-RNTI (Paging RNTI), RA-RNTI (Random Access-RNTI), and/or Temporary C-RNTI. Here, SPS C-RNTI may be included in the CS-RNTI.

For example, the C-RNTI may be a unique identification used for identifying a RRC connection and/or scheduling. Also, the CS-RNTI (e.g., SPS C-RNTI) may be a unique identification used for scheduling of transmissions based on a configured grant. For example, the CS-RNTI may be a unique identification used for activating and/or deactivating transmissions based on the configured grant (e.g., a Type2 configured grant). Also, the RA-RNTI may be an identification used for the random access procedure. Also, the Temporary C-RNTI may be used for the random access procedure (e.g., used for indicating (re)transmission on the UL-SCH (e.g., message 3 transmission, PUSCH transmission) in the contention based random access procedure).

Here, the common search space (the CSS, the UE-common search space) and/or the user-equipment search space (the USS, the UE-specific search space) are defined (or set, configured) in a region(s) of DL control channel(s) (e.g., the DL control channel monitoring regions, CORESET). For example, the CSS may be used for transmission of DCI to a plurality of the UEs 102. That is, the CSS may be defined by a resource common to a plurality of the UEs 102. Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

Also, the USS may be used for transmission of DCI to a specific UE 102. That is, the USS is defined by a resource dedicated to a certain UE 102. The USS may be defined independently for each UE 102. For example, the USS may be composed of CCEs having numbers that are determined based on a Radio Network Temporary Identifier (RNTI) (e.g., the C-RNTI), a slot number in a radio frame, an aggregation level, and/or the like. The RNTI(s) may be assigned by the gNB 160. Namely, each of the USSs corresponding to each of the RNTI(s) described below may be defined. For example, the USS may be defined for the DCI format(s) with the CRC scrambled by the C-RNTI and/or the CS-RNTI.

Here, the gNB 160 may transmit, by using the RRC message, information used for configuring one or more control resource sets (i.e., one or more CORESETs). Here, the information used for configuring the one or more CORESETs may be configured for each of downlink BWP(s) in a serving cell. Also, for each CORESET, the gNB 160 may transmit, by using the RRC message, information used for indicating that the search space is the CSS or the USS. Namely, the information used for indicating that the search space is the CSS or the USS may be configured for each of downlink BWP(s) in a serving cell. Also, for the CSSI and/or the USS, the gNB 160 may transmit, by using the RRC message, information used for indicating to monitor the PDCCH for the DCI format 0_0. Here, the information used for indicating to monitor the PDCCH for the DCI format 0_0 may be configured for each of downlink BWP(s) in a serving cell. Also, for the CSSI and/or the USS, the gNB 160 may transmit, by using the RRC message, information used for indicating to monitor the PDCCH for the DCI format 0_0, or the DCI format 0_1. Here, the information used for indicating to monitor the PDCCH for the DCI format 0_0, or the DCI format 0_1 may be configured for each of downlink BWP(s) in a serving cell.

Also, for the CSS and/or the USS, the gNB 160 may transmit, by using the RRC message, information used for indicating one or more periodicities (e.g., one or more periodicities of a subframe(s), a slot(s), and/or a symbol(s)) for PDCCH monitoring. Also, for the CSSI and/or the USS, the gNB 160 may transmit, by using the RRC message, information used for indicating one or more offsets (e.g., one or more offsets of a subframe(s), a slot(s), and/or a symbol(s)) for PDCCH monitoring. And, a monitoring occasion(s) may be defined, at least, based on the one or more periodicities of the PDCCH monitoring, and/or the one or more offsets of the PDCCH monitoring. Namely, the UE 102 may determine the PDCCH occasion(s) based on the one or more periodicities of the PDCCH monitoring, and/or the one or more offsets of the PDCCH monitoring. For example, the UE 102 may determine, based on the one or more periodicities of the PDCCH monitoring, and/or the one or more offsets of the PDCCH monitoring, the PDCCH occasion(s) for the CSS and/or the USS (e.g., the CSS for the DCI format 0_0, the USS for the DCI format 0_0, the DCI format 0_1).

Figure 12:
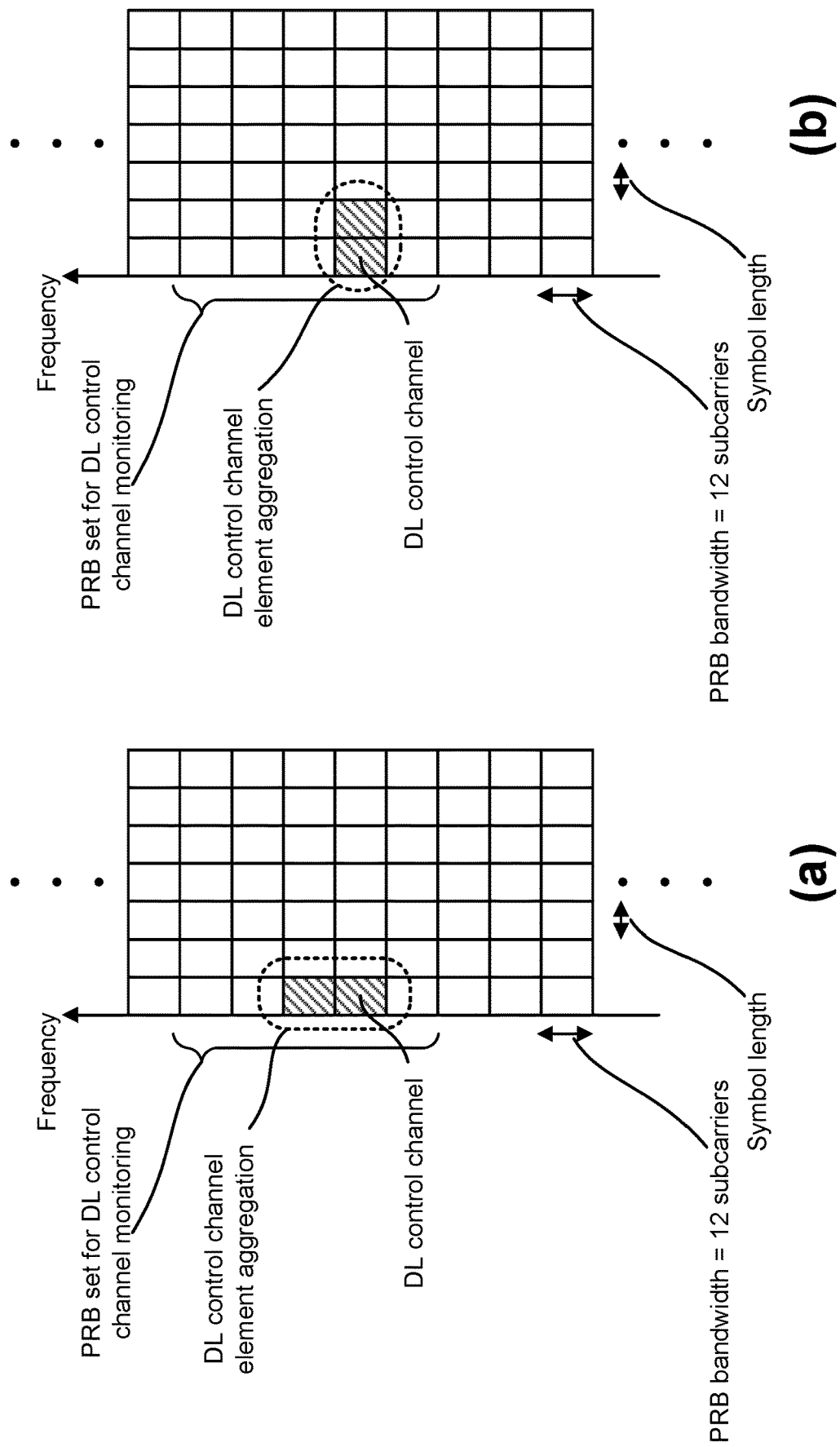
FIG. 12 shows examples of DL control channel which includes more than one control channel elements.

FIG. 12 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 13:
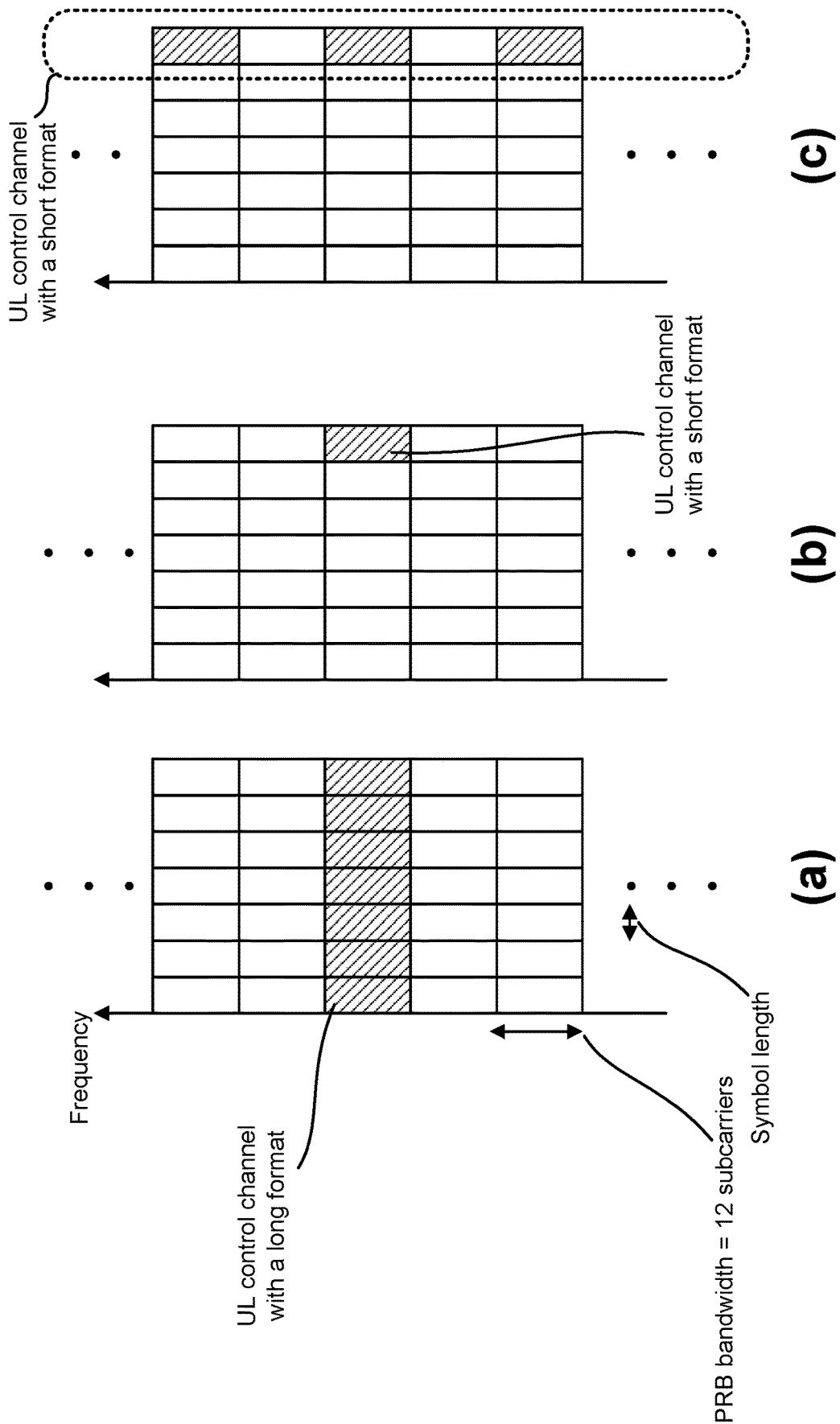
FIG. 13 shows examples of UL control channel structures.

FIG. 13 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 14:
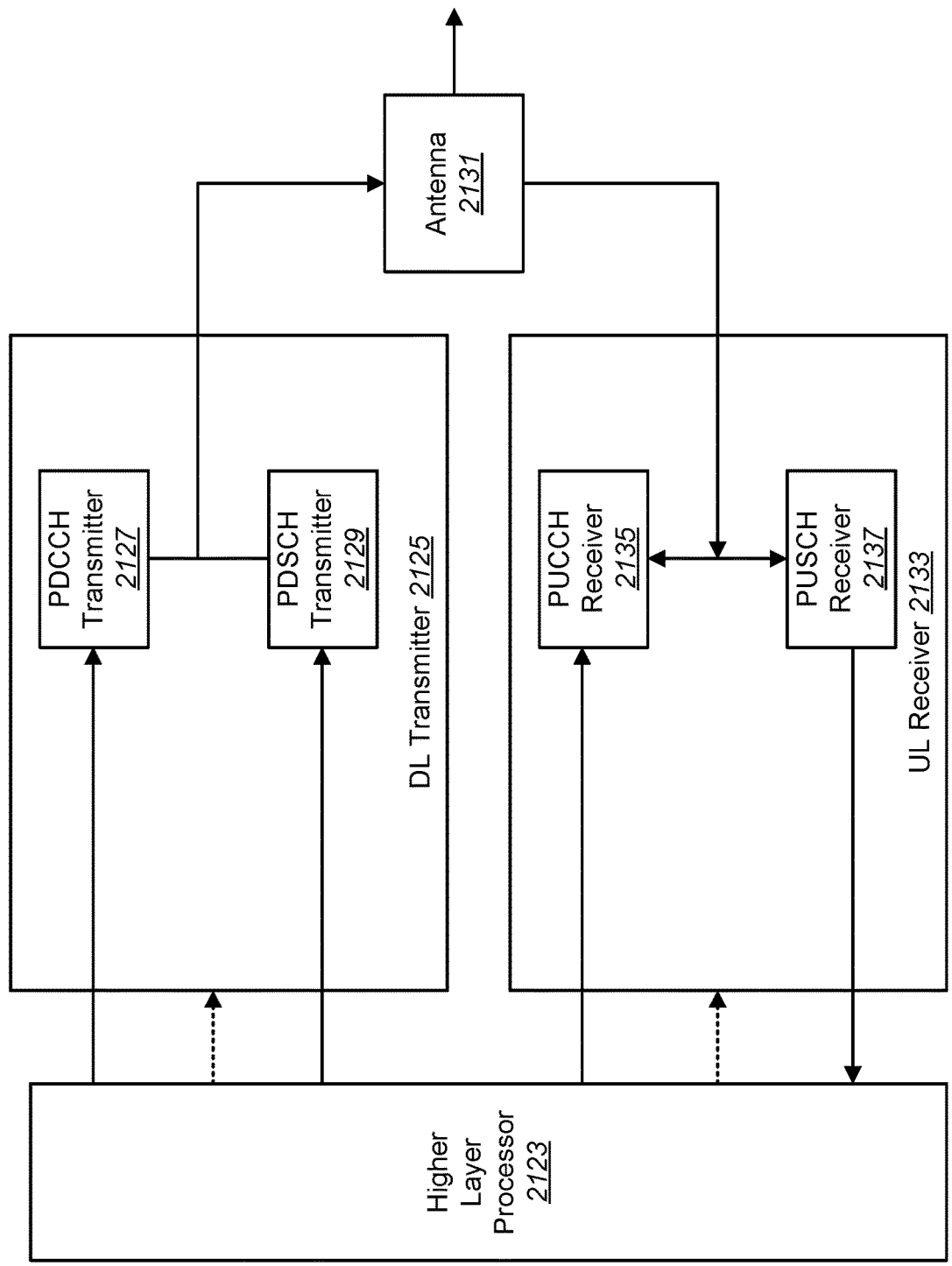
FIG. 14 is a block diagram illustrating one implementation of a gNB.

FIG. 14 is a block diagram illustrating one implementation of a gNB 2160. The gNB 2160 may include a higher layer processor 2123, a DL transmitter 2125, a UL receiver 2133, and one or more antenna 2131. The DL transmitter 2125 may include a PDCCH transmitter 2127 and a PDSCH transmitter 2129. The UL receiver 2133 may include a PUCCH receiver 2135 and a PUSCH receiver 2137.

The higher layer processor 2123 may manage physical layer's behaviors (the DL transmitter's and the UL receiver's behaviors) and provide higher layer parameters to the physical layer. The higher layer processor 2123 may obtain transport blocks from the physical layer. The higher layer processor 2123 may send/acquire higher layer messages such as an RRC message and MAC message to/from a UE's higher layer. The higher layer processor 2123 may provide the PDSCH transmitter transport blocks and provide the PDCCH transmitter transmission parameters related to the transport blocks.

The DL transmitter 2125 may multiplex downlink physical channels and downlink physical signals (including reservation signal) and transmit them via transmission antennas 2131. The UL receiver 2133 may receive multiplexed uplink physical channels and uplink physical signals via receiving antennas 2131 and de-multiplex them. The PUCCH receiver 2135 may provide the higher layer processor 2123 UCI. The PUSCH receiver 2137 may provide the higher layer processor 2123 received transport blocks.

Figure 15:
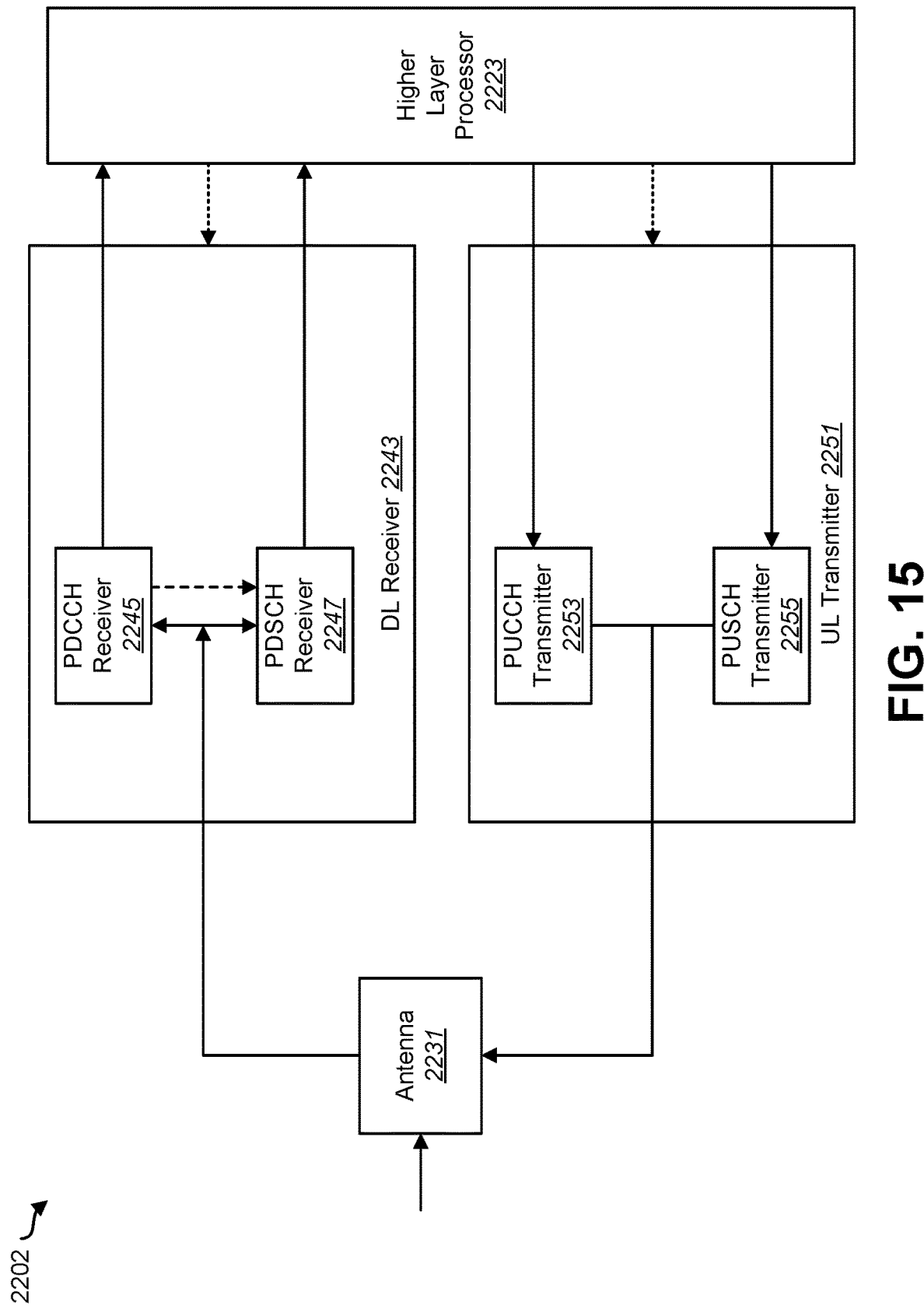
FIG. 15 is a block diagram illustrating one implementation of a UE.

FIG. 15 is a block diagram illustrating one implementation of a UE 2202. The UE 2202 may include a higher layer processor 2223, a UL transmitter 2251, a DL receiver 2243, and one or more antenna 2231. The UL transmitter 2251 may include a PUCCH transmitter 2253 and a PUSCH transmitter 2255. The DL receiver 2243 may include a PDCCH receiver 2245 and a PDSCH receiver 2247.

The higher layer processor 2223 may manage physical layer's behaviors (the UL transmitter's and the DL receiver's behaviors) and provide higher layer parameters to the physical layer. The higher layer processor 2223 may obtain transport blocks from the physical layer. The higher layer processor 2223 may send/acquire higher layer messages such as an RRC message and MAC message to/from a UE's higher layer. The higher layer processor 2223 may provide the PUSCH transmitter transport blocks and provide the PUCCH transmitter 2253 UCI.

The DL receiver 2243 may receive multiplexed downlink physical channels and downlink physical signals via receiving antennas 2231 and de-multiplex them. The PDCCH receiver 2245 may provide the higher layer processor 2223 DCI. The PDSCH receiver 2247 may provide the higher layer processor 2223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 16:
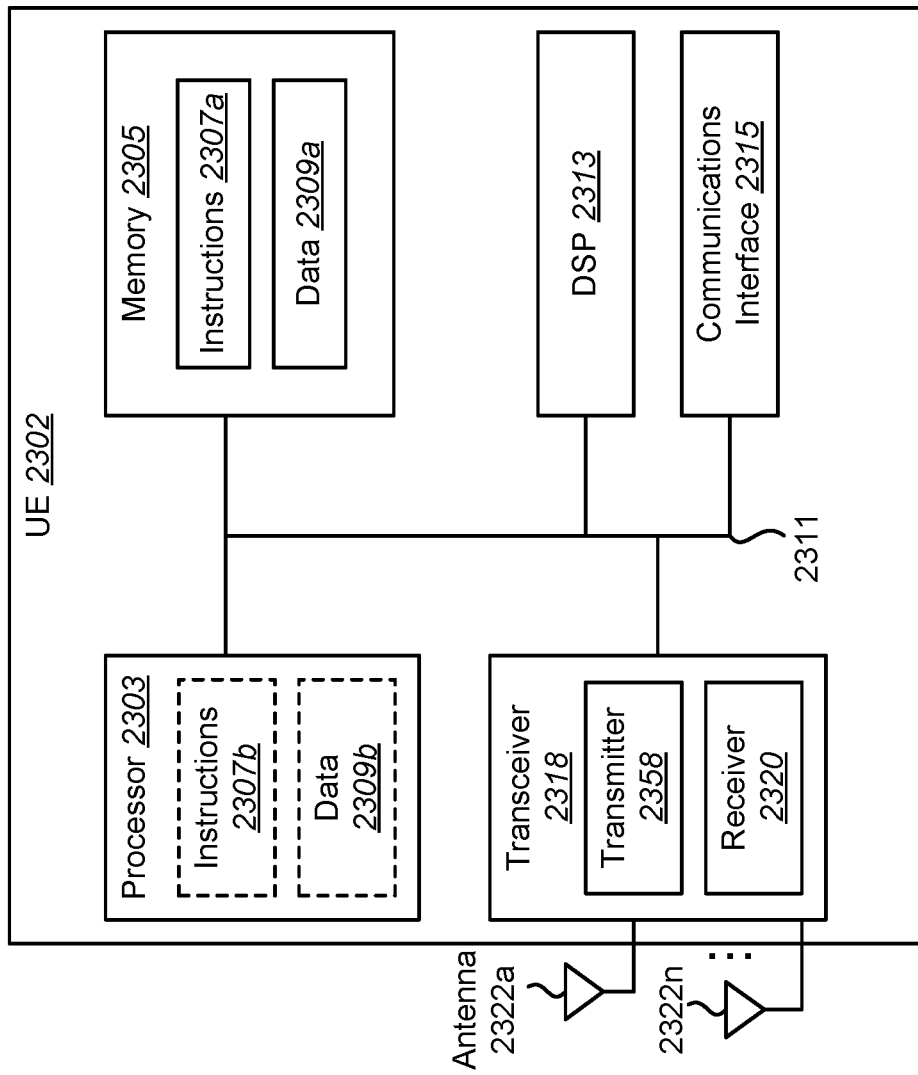
FIG. 16 illustrates various components that may be utilized in a UE.

FIG. 16 illustrates various components that may be utilized in a UE 2302. The UE 2302 described in connection with FIG. 16 may be implemented in accordance with the UE 102 described in connection with FIG. 1. The UE 2302 includes a processor 2303 that controls operation of the UE 2302. The processor 2303 may also be referred to as a central processing unit (CPU). Memory 2305, which may include read-only memory (ROM), random access memory (RAM), a combination of the two or any type of device that may store information, provides instructions 2307a and data 2309a to the processor 2303. A portion of the memory 2305 may also include non-volatile random-access memory (NVRAM). Instructions 2307b and data 2309b may also reside in the processor 2303. Instructions 2307b and/or data 2309b loaded into the processor 2303 may also include instructions 2307a and/or data 2309a from memory 2305 that were loaded for execution or processing by the processor 2303. The instructions 2307b may be executed by the processor 2303 to implement the methods described above.

The UE 2302 may also include a housing that contains one or more transmitters 2358 and one or more receivers 2320 to allow transmission and reception of data. The transmitter(s) 2358 and receiver(s) 2320 may be combined into one or more transceivers 2318. One or more antennas 2322a-n are attached to the housing and electrically coupled to the transceiver 2318.

The various components of the UE 2302 are coupled together by a bus system 2311, which may include a power bus, a control signal bus and a status signal bus, in addition to a data bus. However, for the sake of clarity, the various buses are illustrated in FIG. 16 as the bus system 2311. The UE 2302 may also include a digital signal processor (DSP) 2313 for use in processing signals. The UE 2302 may also include a communications interface 2315 that provides user access to the functions of the UE 2302. The UE 2302 illustrated in FIG. 16 is a functional block diagram rather than a listing of specific components.

Figure 17:
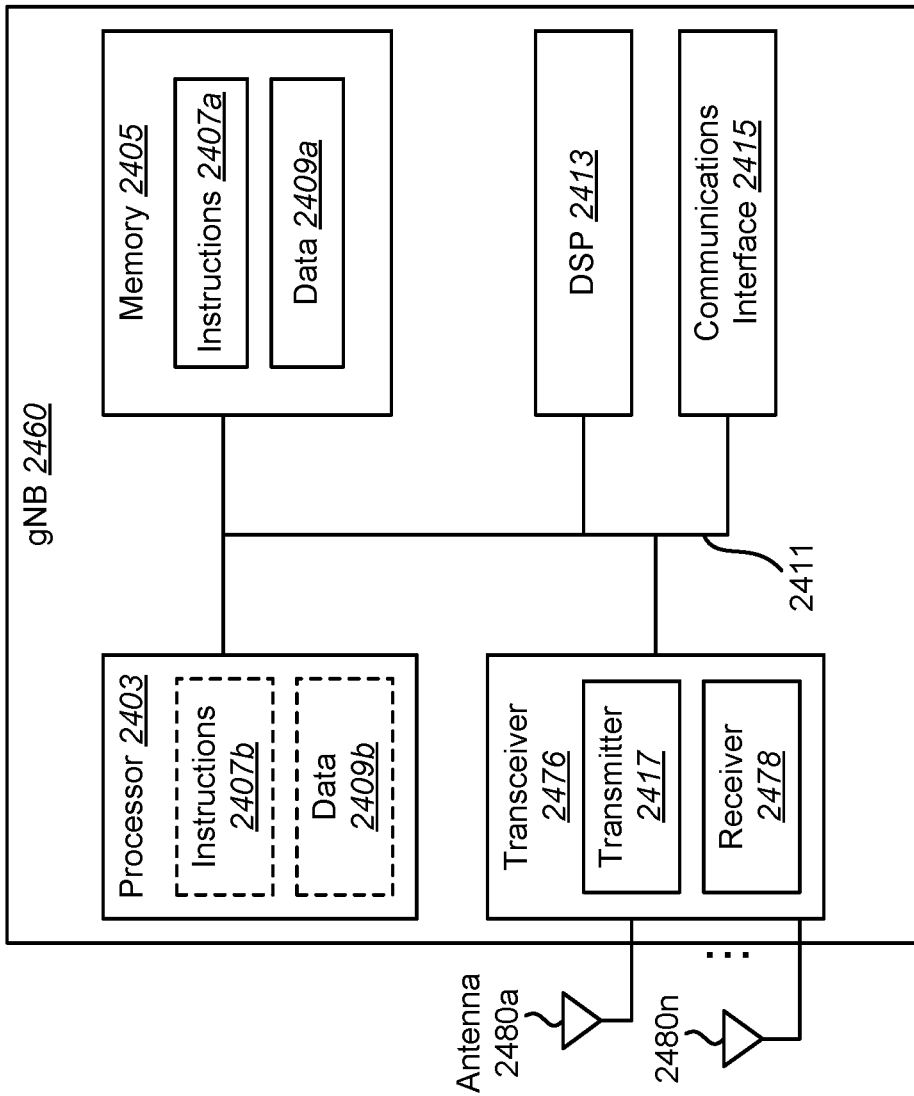
FIG. 17 illustrates various components that may be utilized in a gNB.

FIG. 17 illustrates various components that may be utilized in a gNB 2460. The gNB 2460 described in connection with FIG. 17 may be implemented in accordance with the gNB 160 described in connection with FIG. 1. The gNB 2460 includes a processor 2403 that controls operation of the gNB 2460. The processor 2403 may also be referred to as a central processing unit (CPU). Memory 2405, which may include read-only memory (ROM), random access memory (RAM), a combination of the two or any type of device that may store information, provides instructions 2407*a* and data 2409*a* to the processor 2403. A portion of the memory 2405 may also include non-volatile random-access memory (NVRAM). Instructions 2407*b* and data 2409*b* may also reside in the processor 2403. Instructions 2407*b* and/or data 2409*b* loaded into the processor 2403 may also include instructions 2407*a* and/or data 2409*a* from memory 2405 that were loaded for execution or processing by the processor 2403. The instructions 2407*b* may be executed by the processor 2403 to implement the methods described above.

The gNB 2460 may also include a housing that contains one or more transmitters 2417 and one or more receivers 2478 to allow transmission and reception of data. The transmitter(s) 2417 and receiver(s) 2478 may be combined into one or more transceivers 2476. One or more antennas 2480*a-n* are attached to the housing and electrically coupled to the transceiver 2476.

The various components of the gNB 2460 are coupled together by a bus system 2411, which may include a power bus, a control signal bus and a status signal bus, in addition to a data bus. However, for the sake of clarity, the various buses are illustrated in FIG. 17 as the bus system 2411. The gNB 2460 may also include a digital signal processor (DSP) 2413 for use in processing signals. The gNB 2460 may also include a communications interface 2415 that provides user access to the functions of the gNB 2460. The gNB 2460 illustrated in FIG. 17 is a functional block diagram rather than a listing of specific components.

Figure 18:
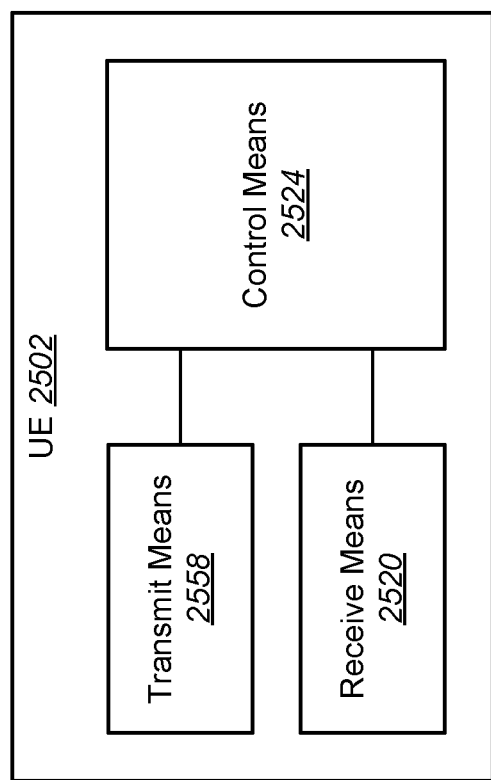
FIG. 18 is a block diagram illustrating one implementation of a UE in which systems and methods for uplink transmission without grant may be implemented.

FIG. 18 is a block diagram illustrating one implementation of a UE 2502 in which systems and methods for uplink transmission without grant may be implemented. The UE 2502 includes transmit means 2558, receive means 2520 and control means 2524. The transmit means 2558, receive means 2520 and control means 2524 may be configured to perform one or more of the functions described in connection with FIG. 1 above. FIG. 16 above illustrates one example of a concrete apparatus structure of FIG. 18. Other various structures may be implemented to realize one or more of the functions of FIG. 1. For example, a DSP may be realized by software.

Figure 19:
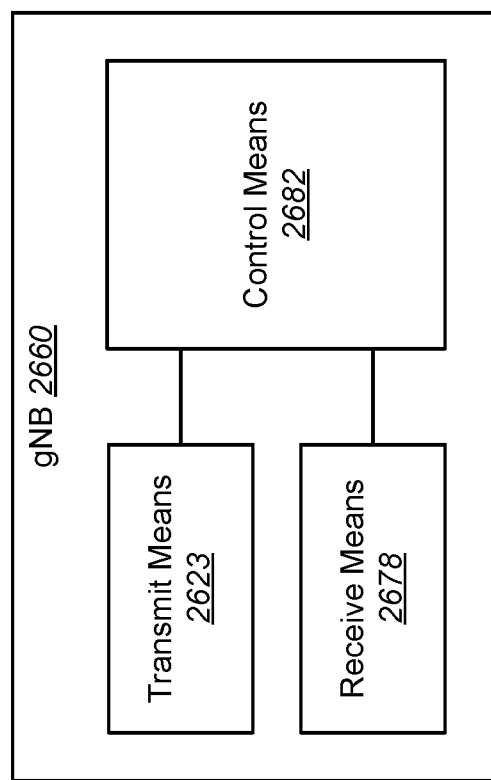
FIG. 19 is a block diagram illustrating one implementation of a gNB in which systems and methods for uplink transmission without grant may be implemented.

FIG. 19 is a block diagram illustrating one implementation of a gNB 2660 in which systems and methods for uplink transmission without grant may be implemented. The gNB 2660 includes transmit means 2623, receive means 2678 and control means 2682. The transmit means 2623, receive means 2678 and control means 2682 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE) comprising:
receiving circuitry configured to receive a radio resource control (RRC) message comprising a first parameter used for configuring a periodicity,
the receiving circuitry being configured to receive the RRC message comprising a second parameter used for configuring a number of repetitions, and
transmitting circuitry configured to perform, based on the first parameter and the second parameter, repetitions of transmissions of a transport block, wherein
the repetitions of transmissions of the transport block consist of initial transmission of the transport block and retransmission(s) of the transport block, wherein the initial transmission of the transport block is a first transmission among the repetitions,
the number of repetitions is less than or equal to a number of slots within a period, the period is a time interval between two consecutive initial transmissions by configured grants.

2. A base station apparatus comprising:
transmitting circuitry configured to transmit a radio resource control (RRC) message comprising a first parameter used for configuring a periodicity,
the transmitting circuitry being configured to transmit the RRC message comprising a second parameter used for configuring a number of repetitions, and
receiving circuitry configured to receive, based on the first parameter and the second parameter, repetitions of transmissions of a transport block, wherein
the repetitions of transmissions of the transport block consist of initial transmission of the transport block and retransmission(s) of the transport block, wherein the initial transmission of the transport block is a first transmission among the repetitions,
the base station apparatus configures the number of repetitions such that the number of repetitions is less than or equal to a number of slots within a period, the period is a time interval between two consecutive initial transmissions by configured grants.

3. A communication method of a user equipment (UE) comprising:
receiving a radio resource control (RRC) message comprising a first parameter used for configuring a periodicity,
receiving the RRC message comprising a second parameter used for configuring a number of repetitions, and
performing, based on the first parameter and the second parameter, repetitions of transmissions of a transport block, wherein
the repetitions of transmissions of the transport block consist of initial transmission of the transport block and retransmission(s) of the transport block, wherein the initial transmission of the transport block is a first transmission among the repetitions,
the number of repetitions is less than or equal to a number of slots within a period, the period is a time interval between two consecutive initial transmissions by configured grants.

4. A communication method of a base station apparatus comprising:
transmitting a radio resource control (RRC) message comprising a first parameter used for configuring a periodicity,
configuring a number of repetitions such that the number of repetitions is less than or equal to a number of slots within a period, the period is a time interval between two consecutive initial transmissions by configured grants,
transmitting the RRC message comprising a second parameter used for configuring the number of repetitions, and
receiving, based on the first parameter and the second parameter, repetitions of transmissions of a transport block, wherein
the repetitions of transmissions of the transport block consist of initial transmission of the transport block and retransmission(s) of the transport block, wherein the initial transmission of the transport block is a first transmission among the repetitions.

\* \* \* \* \*